United States Patent
Yan

(10) Patent No.: US 11,442,751 B2
(45) Date of Patent: Sep. 13, 2022

(54) METHOD FOR ADJUSTING INTELLIGENT RECOMMENDATION, TERMINAL, AND SERVER

(71) Applicant: HUAWEI TECHNOLOGIES CO., LTD., Shenzhen (CN)

(72) Inventor: Pengcheng Yan, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/960,484

(22) PCT Filed: Apr. 17, 2019

(86) PCT No.: PCT/CN2019/083093
§ 371 (c)(1),
(2) Date: Jul. 7, 2020

(87) PCT Pub. No.: WO2019/206010
PCT Pub. Date: Oct. 31, 2019

(65) Prior Publication Data
US 2021/0065055 A1  Mar. 4, 2021

(30) Foreign Application Priority Data
Apr. 24, 2018 (CN) .......................... 201810374098.5

(51) Int. Cl.
*G06F 9/451* (2018.01)
*G06F 16/9535* (2019.01)
(Continued)

(52) U.S. Cl.
CPC .......... *G06F 9/451* (2018.02); *G06F 3/04842* (2013.01); *G06F 3/04847* (2013.01);
(Continued)

(58) Field of Classification Search
CPC ..... G06N 20/00; G06F 9/451; G06F 16/9535; G06F 16/9538; G06F 3/04842; G06F 3/04847; G06Q 30/0631
See application file for complete search history.

(56) References Cited

U.S. PATENT DOCUMENTS 9,507,494 B1 * 11/2016 Kerr .................. G06Q 30/0261
2009/0187561 A1 * 7/2009 Park ..................... G06F 16/951
(Continued)

FOREIGN PATENT DOCUMENTS

| CN | 101112092 A | 1/2008 |
|---|---|---|
| CN | 101578601 A | 11/2009 |

(Continued)

*Primary Examiner* — Roberto Borja
(74) *Attorney, Agent, or Firm* — Leydig, Voit & Mayer, Ltd.

(57) ABSTRACT

The present application relates to an intelligent recommendation method, a terminal, and a server. The method includes: displaying a first modification interface in response to a first operation that is input by a user. The first modification interface displays a plurality of recommendation parameters. The method further comprises sending a first modification request to a first server in response to a second operation that is input by the user. The first modification request requests the server to modify at least one recommendation parameter. The method further comprises sending a recommendation request to the server, receiving a recommended content from the server and displaying the recommended content.

6 Claims, 17 Drawing Sheets

(51) Int. Cl.
  *G06F 3/04842*   (2022.01)
  *G06F 3/04847*   (2022.01)
  *G06N 20/00*    (2019.01)
  *G06F 16/9538*   (2019.01)
  *G06Q 30/06*    (2012.01)

(52) U.S. Cl.
  CPC ...... *G06F 16/9535* (2019.01); *G06F 16/9538* (2019.01); *G06N 20/00* (2019.01); *G06Q 30/0631* (2013.01)

(56) References Cited

U.S. PATENT DOCUMENTS

| | | | |
|---|---|---|---|
| 2013/0167168 A1* | 6/2013 | Ellis | H04N 21/25891 725/12 |
| 2015/0169705 A1* | 6/2015 | Korbecki | G06F 16/248 707/736 |
| 2016/0034260 A1 | 2/2016 | Ristock et al. | |
| 2016/0050446 A1* | 2/2016 | Fujioka | A63F 13/792 725/93 |
| 2017/0324800 A1 | 11/2017 | Deluca et al. | |

FOREIGN PATENT DOCUMENTS

| | | |
|---|---|---|
| CN | 103324641 A | 9/2013 |
| CN | 103544219 A | 1/2014 |
| CN | 103885976 A | 6/2014 |
| CN | 104182413 A | 12/2014 |
| CN | 104298686 A | 1/2015 |
| CN | 104348714 A | 2/2015 |
| CN | 104820665 A | 8/2015 |
| CN | 105095427 A | 11/2015 |
| CN | 105404678 A | 3/2016 |
| CN | 105809558 A | 7/2016 |
| CN | 105868564 A | 8/2016 |
| CN | 106210127 A | 12/2016 |
| CN | 106603672 A | 4/2017 |
| CN | 106952130 A | 7/2017 |
| CN | 107257499 A | 10/2017 |
| CN | 107562818 A | 1/2018 |
| CN | 107577821 A | 1/2018 |
| CN | 107704571 A | 2/2018 |
| CN | 107729542 A | 2/2018 |
| CN | 107798100 A | 3/2018 |
| CN | 107885776 A | 4/2018 |
| EP | 2627034 A1 | 8/2013 |
| EP | 3246860 A1 | 11/2017 |

* cited by examiner

METHOD FOR ADJUSTING INTELLIGENT RECOMMENDATION, TERMINAL, AND SERVER

CROSS-REFERENCE TO RELATED APPLICATIONS

This application is a National Stage of International Application No. PCT/CN2019/083093, filed on Apr. 17, 2019, which claims priority to Chinese Patent Application No. 201810374098.5, filed on Apr. 24, 2018, both of which are hereby incorporated by reference in their entireties.

TECHNICAL FIELD

The present application relates to the field of intelligent recommendation, and in particular, to a method, a terminal, and a server for adjusting intelligent recommendation.

BACKGROUND

Intelligent recommendation is one of the most important and common applications in the field of artificial intelligence. To facilitate unified description of different recommendation scenarios (for example, news, shopping mall, and advertisement), services such as commodities, information, and advertisement that may be recommended are collectively referred to as candidate content, and correspondingly a set of such services is collectively referred to as a candidate set. Factors that may affect a recommendation result are collectively referred to as features. For example, age, address, and gender of a user are collectively referred to as user features. For another example, recent popularity, category, and price of a candidate are collectively referred to as content features.

In the prior art, one method is to perform recommendation based on a fixed setting of a specific user and popularity of a candidate set, including the following cases: (1) A recommendation list suitable for a large sample, that is, a candidate set with maximum popularity is established based on selection of a wide range of users. (2) A corresponding type of information is found out from the recommendation list in (1) and recommended to the user based on a fixed selection of the user, for example, information about real estate and sports fixedly set in an information application. However, in the method, the recommended content is consistent with tendency of the large sample, and the recommendation is not personalized and refined.

Another method is to perform recommendation based on a real-time user profile of a specific user and large sample data of a wide range of users. A model training process shown in FIG. 1 includes model training and recommendation service. Disadvantages of the method are as follows: (1) A main process of a recommendation result is controlled by a recommendation service provider, and a user lacks a sense of participation. For example, the user is bored by too many product recommendations, and many users feel that their privacy is threatened. At the same time, most of the time, consumers also want to be able to adjust and improve their own consumption trends, unwilling to be guided. (2) When a preference of the user changes in a short period of time, recommendation cannot be updated in time in the foregoing technical solution.

In conclusion, currently, a recommendation service provider completes a recommendation process by using large sample data and data of a user in a past period of time. A process of constructing the recommendation is a closed-loop process and is closed to the user, and therefore the user cannot participate in the recommendation process.

SUMMARY

Embodiments of the present application provide a user-adjustable intelligent recommendation method. An interface opened to a user is added, so that the user can participate in an intelligent recommendation process. This makes the recommendation more accurate and personalized.

According to a first aspect, an embodiment of the present application provides a method for modifying a recommendation parameter. The method includes: displaying, by a terminal, a user interface, and displaying, by the user interface, options of modifiable recommendation parameters of recommended content; displaying, by the terminal, a first modification interface in response to a first operation that is input by a user for the options, where the first operation is used to request to display the first modification interface, and the first modification interface displays a plurality of recommendation parameters; and sending, by the terminal, a first modification request to a first server in response to a second operation that is input by the user, where the second operation is used to modify at least one of the plurality of recommendation parameters, and the first modification request is used to request the server to modify the at least one recommendation parameter. When the user participates in the intelligent recommendation process through the interface and modifies a feature value and a feature weight, a recommendation offset caused by unexpected and temporary browsing can be corrected, providing more accurate and personalized experience.

In a possible implementation, each of the plurality of recommendation parameters corresponds to a feature value and a feature weight of a feature, and the feature is a user feature or a content feature of candidate content.

In a possible implementation, the first modification request specifically includes: modifying a feature value and/or a feature weight of the feature. Feature value modification options are provided for a system to select more effective candidate sets and affect a final model calculation. Feature weight modification options are provided to enhance or reduce impact of a feature in a final recommendation.

In a possible implementation, the first modification interface includes a plurality of areas, and there are a plurality of boundaries between the plurality of areas. Each of the plurality of areas corresponds to one feature, and a size of each of the plurality of areas corresponds to the feature weight of the feature. The second operation includes an operation of moving at least one of the plurality of boundaries, and the first modification request specifically includes: modifying a feature weight of a feature associated with the at least one boundary. An intuitive interface facilitates the user to modify the weight.

In a possible implementation, the first modification interface includes a plurality of areas, and after the displaying, by the terminal, a first modification interface, the method further includes: displaying, by the terminal, a second modification interface in response to a third operation that is input by the user and received by the terminal, where the third operation is used to instruct to activate an area in the plurality of areas, and the second modification interface displays a feature value modification range of a feature corresponding to the area. The second operation includes an operation of selecting a target range from the feature value modification range of the feature corresponding to the area. The first modification request specifically includes: modifying the feature value of the feature corresponding to the area to the target range. The intuitive interface facilitates the user to modify the feature value.

In a possible implementation, the method further includes: sending, by the terminal, a recommendation request to the server; receiving, by terminal, recommended content by the server, where recommended content is determined by the server based on a plurality of modified recommendation parameters; and displaying, by terminal, the recommended content.

According to a second aspect, an embodiment of the present application provides a method for modifying a recommendation parameter. The method includes: receiving, by a server, a modification request sent by a terminal, where the modification request is a request generated by the terminal when the terminal receives a modification operation that is input by a user, and the modification request is used to request to modify at least one of recommendation parameters; and modifying, by the server, the at least one recommendation parameter based on the modification request.

In a possible implementation, the method further includes: receiving, by the server, a recommendation request sent by the terminal; obtaining, by the server, a plurality of recommendation parameters based on the recommendation request; determining, by the server, recommended content based on the plurality of recommendation parameters; and sending, by the server, the recommended content to the terminal. The recommended content is re-determined based on the parameter modified by the user. This makes the recommended content more targeted and personalized.

In a possible implementation, the plurality of recommendation parameters include at least one recommendation parameter modified based on the modification operation from the user.

In a possible implementation, each of the plurality of recommendation parameters corresponds to a feature value and a feature weight of a feature. the feature is a user feature or a content feature of candidate content. That the server determines recommended content based on the plurality of recommendation parameters includes: obtaining, by the server, a candidate set based on feature values of content features in the plurality of recommendation parameters, where the candidate set includes a plurality of pieces of candidate content; inputting, by the server, the feature value of the user feature and the feature values of the content features of the candidate content in the candidate set into a recommendation model; and determining the recommended content based on an output of the recommendation model.

In a possible implementation manner, when the at least one modified recommendation parameter further includes feature weights of the plurality of features, before the server inputs the feature value of the user feature and the feature values of the content features of the candidate content in the candidate set into a recommendation model, the method further includes: modifying, by the server, the recommendation model based on the feature weights of the plurality of features.

According to a third aspect, an embodiment of the present application provides a terminal. The terminal may implement a function performed by the terminal in the method for modifying a recommendation parameter in the first aspect. The function may be implemented by using hardware, or may be implemented by hardware by executing corresponding software. The hardware or software includes one or more modules corresponding to the foregoing function.

In a possible implementation, the terminal includes a display module, a receiving module, a display module, and a sending module. The display module displays a user interface, and the user interface displays options of modifiable recommendation parameters of recommended content. In response to the receiving module receives a first operation that is input by a user for the options, the display module displays a first modification interface. The first operation is used to request to display the first modification interface, and the first modification interface displays a plurality of recommendation parameters. The receiving module receives a second operation that is input by the user, and the sending module sends a first modification request to a first server. The second operation is used to modify at least one of the plurality of recommendation parameters, and the first modification request is used to request the server to modify the at least one recommendation parameter.

In a possible implementation, each of the plurality of recommendation parameters corresponds to a feature value and a feature weight of a feature, and the feature is a user feature or a content feature of candidate content.

In a possible implementation, the first modification request specifically includes: modifying a feature value and/or a feature weight of the feature.

In a possible implementation, the first modification interface includes a plurality of areas, and there are a plurality of boundaries between the plurality of areas. Each of the plurality of areas corresponds to one feature, and a size of each of the plurality of areas corresponds to the feature weight of the feature. The second operation includes an operation of moving at least one of the plurality of boundaries, and the first modification request specifically includes: modifying a feature weight of a feature associated with the at least one boundary.

In a possible implementation, the first modification interface includes a plurality of areas. After the display module displays the first modification interface, the receiving module is further configured to receive a third operation that is input by the user. The display module is further configured to: display a second modification interface in response to a third operation from the user, where the third operation is used to instruct to activate an area in the plurality of areas, and the second modification interface displays a feature value modification range of a feature corresponding to the area. The second operation includes an operation of selecting a target range from the feature value modification range of the feature corresponding to the area. The first modification request specifically includes: modifying the feature value of the feature corresponding to the area to the target range.

In a possible implementation, a second receiving module included. The sending module sends a recommendation request to the server. The second receiving module is configured to receive recommended content from the server, and the recommended content is determined based on a plurality of modified recommendation parameters. The displaying module displays the recommended content.

According to a fourth aspect, an embodiment of the present application provides a server. The server may implement a function performed by the server in the method for modifying a recommendation parameter in the second aspect. The function may be implemented by using hardware, or may be implemented by hardware by executing corresponding software. The hardware or software includes one or more modules corresponding to the foregoing function.

In a possible implementation, the server includes: a receiving module, configured to receive a modification request of a terminal, where the modification request is sent based on a modification operation that is input by a user, and the modification operation that is input by the user is used to request to modify at least one of a plurality of recommendation parameters; and a processing module, configured to modify the at least one recommendation parameter based on the modification request.

In a possible implementation, the server further includes a sending module. The receiving module receives a recommendation request from the terminal. The processing module obtains a plurality of recommendation parameters based on the recommendation request. The processing module determines recommended content based on the plurality of recommendation parameters. The sending module sends the recommended content to the terminal.

In a possible implementation, the plurality of recommendation association parameters include feature values of a plurality of features. Each of the plurality of features is a user feature or a content feature of candidate content. That the processing module determines recommended content based on the plurality of recommendation association parameters includes: obtaining, by the processing module, a candidate set based on feature values of content features in the plurality of recommendation association parameters, where the candidate set includes a plurality of pieces of candidate content; inputting, by the processing module, the feature value of the user feature and the feature values of the content features of the candidate content in the candidate set into a recommendation model; and determining, by the processing module, the recommended content based on an output of the recommendation model.

In a possible implementation, the plurality of recommendation parameters include at least one recommendation parameter modified based on the modification operation from the user.

In a possible implementation, each of the plurality of recommendation parameters corresponds to a feature value and a feature weight of a feature, and the feature is a user feature or a content feature of candidate content. The processing module obtains a candidate set based on feature values of content features in the plurality of recommendation parameters, where the candidate set includes a plurality of pieces of candidate content. The processing module inputs the feature value of the user feature and the feature values of the content features of the candidate content in the candidate set into a recommendation model. The processing module determines the recommended content based on an output of the recommendation model.

In a possible implementation manner, when the at least one modified recommendation parameter further includes feature weights of the plurality of features, before the processing module inputs the feature value of the user feature and the feature values of the content features of the candidate content in the candidate set into a recommendation model, the processing module is further configured to modify the recommendation model based on the feature weights of the features.

According to a fifth aspect, an embodiment of the present application provides a terminal. The terminal may implement a function performed by the terminal in the method for modifying a recommendation parameter in the first aspect. The function may be implemented by using hardware, or may be implemented by hardware by executing corresponding software. The hardware or software includes one or more modules corresponding to the foregoing function.

In a possible implementation, the terminal includes a memory, a processor, a wireless communications interface, a display unit, an input device, and a program instruction that is stored in the memory and that can run on the processor. When executed by the processor, the program instruction stored in the memory is used to perform the following operations: instructing the display unit to display a user interface, where the user interface displays options of modifiable recommendation parameters of recommended content; instructing the display unit to display a first modification interface in response to a first operation that is input by a user for the options by using an input device, where the first operation is used to request the display unit to display the first modification interface, and the first modification interface displays a plurality of recommendation parameters; and instructing the wireless communications interface to send a first modification request to a first server in response to a second operation that is input by the user, where the second operation is used to modify at least one of the plurality of recommendation parameters, and the first modification request is used to request the server to modify the at least one recommendation parameter.

In a possible implementation, each of the plurality of recommendation parameters corresponds to a feature value and a feature weight of a feature, and the feature is a user feature or a content feature of candidate content.

In a possible implementation, the first modification request specifically includes: modifying a feature value and/or a feature weight of the feature.

In a possible design, the first modification interface includes a plurality of areas, and there are a plurality of boundaries between the plurality of areas. Each of the plurality of areas corresponds to one feature, and a size of each of the plurality of areas corresponds to the feature weight of the feature. The second operation includes an operation of moving at least one of the plurality of boundaries, and the first modification request specifically includes: modifying a feature weight of a feature associated with the at least one boundary.

In a possible design, the first modification interface includes a plurality of areas. When executed by the processor, the program instruction stored in the memory is used to perform the following operations: instructing the input device to receive a third operation that is input by the user after the display module displays the first modification interface; and instructing the display unit to display a second modification interface in response to a third operation from the user, where the third operation is used to instruct to activate an area in the plurality of areas, and the second modification interface displays a feature value modification range of a feature corresponding to the area. The second operation includes an operation of selecting a target range from the feature value modification range of the feature corresponding to the area. The first modification request specifically includes: modifying the feature value of the feature corresponding to the area to the target range.

In a possible implementation, when executed by the processor, the program instruction stored in the memory is used to perform the following operations: instructing the wireless communications interface to send a recommendation request to the server; instructing the wireless communications interface to receive recommended content from the server, where the recommended content is determined based on a plurality of modified recommendation parameters; and instructing the displaying unit to display the recommended content.

According to a sixth aspect, an embodiment of the present application provides a server. The server may implement a function performed by the server in the method for modifying a recommendation parameter in the second aspect. The function may be implemented by using hardware, or may be implemented by hardware by executing corresponding software. The hardware or software includes one or more modules corresponding to the foregoing function.

In a possible implementation, the server includes a memory, a processor, a communications interface, and a program instruction stored in the memory. When executed by the processor, the program instruction in the memory is used to perform the following operations: instructing the communications interface to receive a modification request of a terminal, where the modification request is sent based on a modification operation from a user, and the modification operation from the user is used to request to modify at least one recommendation parameter. Then the at least one recommendation parameter is modified for the user based on the modification request.

In a possible implementation, when executed by the processor, the program instruction in the memory is used to perform the following operations: instructing the communications interface to receive a recommendation request from the server; obtaining a plurality of recommendation parameters based on the recommendation request; determining recommended content based on the plurality of recommendation parameters; and instructing the communications interface to send the recommended content to the terminal.

In a possible implementation, the plurality of recommendation parameters include at least one recommendation parameter modified based on the modification operation from the user.

In a possible implementation, each of the plurality of recommendation parameters corresponds to a feature value and a feature weight of a feature, and the feature is a user feature or a content feature of candidate content. When executed by the processor, the program instruction stored in the memory is used to perform the following operations: obtaining a candidate set based on feature values of content features in the plurality of recommendation parameters, where the candidate set includes a plurality of pieces of candidate content; inputting the feature value of the user feature and the feature values of the content features of the candidate content in the candidate set into a recommendation model; and determining the recommended content based on an output of the recommendation model.

In a possible implementation manner, when the at least one modified recommendation parameter further includes feature weights of the plurality of features, before the processor inputs the feature value of the user feature and the feature values of the content features of the candidate content in the candidate set into a recommendation model, when executed by the processor, the program instruction stored in the memory is used to perform the following operations: modifying the recommendation model based on the feature weights of the plurality of features.

According to a seventh aspect, an embodiment of the present application provides a computer-readable storage medium, including an instruction. When the instruction runs on a computer, the computer performs the method according to the first aspect or the second aspect, or the method according to any possible design of the first aspect and the second aspect.

According to an eighth aspect, an embodiment of the present application provides a computer program product including an instruction. When the computer program product runs on a computer, the computer performs the method according to the first aspect or the second aspect, or the method according to any possible design of the first aspect and the second aspect.

DESCRIPTION OF EMBODIMENTS

In the specification, claims, and accompanying drawings of the embodiments of the present application, the terms "first", "second", and so on are intended to distinguish between similar objects but do not necessarily indicate a specific order or sequence. In addition, the terms "include", "have", and any other variants thereof are intended to cover non-exclusive inclusion, for example, include a series of steps or units. A method, system, product, or device is not necessarily limited to those steps or units that are expressly listed, but may include other steps or units that are not expressly listed or inherent to such a process, method, product, or device.

In the embodiments of the present application, an interface opened to a user is added to a complete recommendation process, so that the user participates in the recommendation process.

Internal logic may be adjusted, so that adjustable items finally presented to the user are a feature value and a feature weight, or at least the feature value can be ensured to be adjustable.

In this embodiment of the present application, in the recommendation service, feature values or feature weights of a plurality of features are adjusted. The adjusted feature values and feature weights are recommendation parameters, and the plurality of features are classified into user features and content features.

Figure 1:
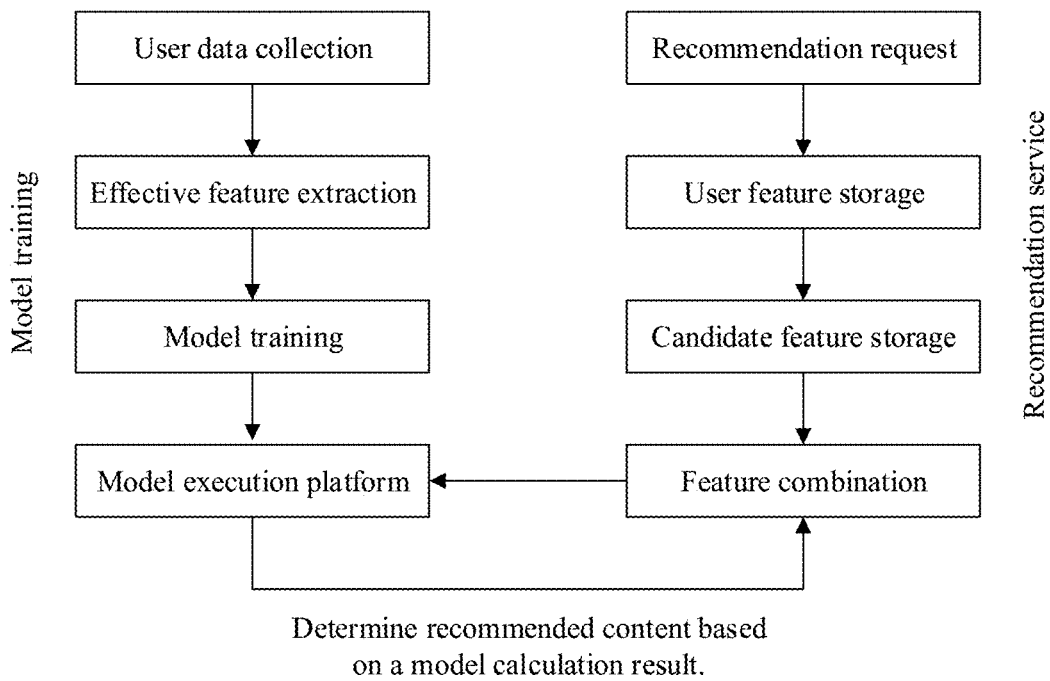
FIG. 1 is a recommendation flowchart in the prior art.
Figure 2:
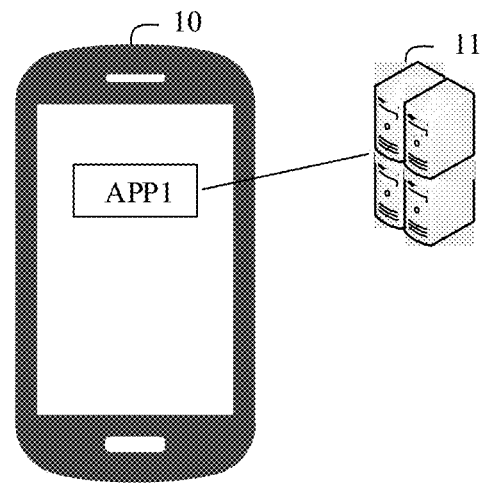
FIG. 2 is a diagram of an application scenario according to an embodiment of the present application.

FIG. 2 is a diagram of an application scenario according to an embodiment of the present application. As shown in FIG. 2, an embodiment of the present application relates to a terminal 10. One or more applications (APP) may be installed on the terminal, and the terminal may communicate with an application server by using the installed application corresponding to the application server.

In this embodiment of the present application, the application server 11 may include a recommendation server, a storage server, and a server specially used for executing a recommendation model. The recommendation server, the storage server, and the server specially used for executing a recommendation model may be a same server, or may be different servers.

The terminal 10 in this embodiment of the present application may be a device that provides data connectivity for a user. The terminal may communicate with the server of the application by using a client of the application. The terminal may be a mobile terminal, for example, a mobile phone (or also referred to as a cellular phone), and a computer that has a mobile terminal. For example, the terminal may be a portable, pocket-size, handheld, computer-integrated or vehicle-mounted mobile apparatus, which exchanges languages and/or data with the wireless access network. For example, it may be a device such as a personal communication service (PCS) phone, a cordless telephone set, a session initiation protocol (SIP) phone, a wireless local loop (WLL) station, or a personal digital assistant (PDA). The terminal may also be referred to as a system, a subscriber unit, a subscriber station, a mobile station, a remote station, an access point, a remote terminal, an access terminal, a user terminal, a user agent, a user device, or user equipment.

Embodiments of the present application provide a user-adjustable intelligent recommendation method. An interface opened to a user is added, so that the user can participate in the intelligent recommendation process and modify a feature value and a feature weight. This makes the recommendation more accurate and personalized.

The technical solution of the present application includes two phases: a modification phase and a recommendation phase. The user participates in modification of the feature value and/or the feature weight in the modification phase. The following further describes the present application by using an example in which a video application on a mobile phone recommends a video.

Figure 3:
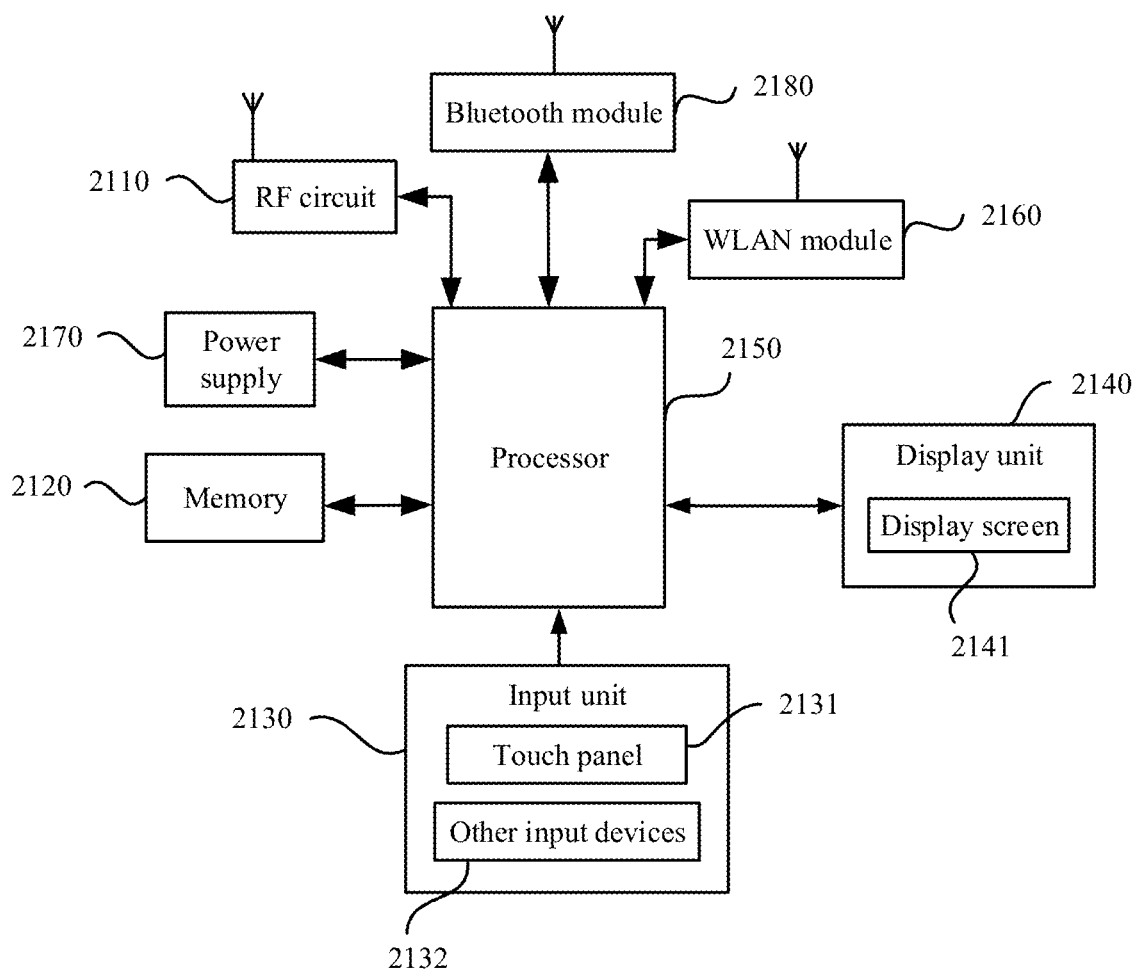
FIG. 3 is a schematic structural diagram of a terminal according to an embodiment of the present application.

FIG. 3 is a schematic structural diagram of a terminal according to an embodiment of the present application. As shown in FIG. 3, a terminal 2100 includes a radio frequency (RF) circuit 2110, a memory 2120, an input unit 2130, a display unit 2140, a processor 2150, a wireless local area network (WLAN) module 2160, a power supply 2170, a Bluetooth module 2180, and other components. A person skilled in the art may understand that a structure of the terminal shown in FIG. 3 does not constitute a limitation to the terminal, and the terminal may include more components or fewer components than those shown in FIG. 3, or some components may be combined, or a different component deployment may be used.

The RF circuit 2110 may be configured to receive/send information, for example, connect to a mobile broadband to receive/send information. Generally, an RF circuit 2110 includes but is not limited to an antenna, at least one amplifier, a transceiver, a coupler, a low noise amplifier (LNA), a duplexer, and the like. In addition, the RF circuit 2110 may further forward a mobile bandwidth service to the WLAN module 2160, to forward the mobile bandwidth service to another terminal by using the WLAN module 2160. Any communications standard or protocol may be used for wireless communication, including but not limited to Global System for Mobile Communications (GSM), General Packet Radio Service (GPRS), Code Division Multiple Access (CDMA), Wideband Code Division Multiple Access (WCDMA), Long Term Evolution (LTE), email, short message service (SMS) protocol, and the like.

The memory 2120 may be configured to store a program instruction, and the processor 2150 runs the program instruction stored in the memory 2120. The memory 2120 may mainly include a storage program area and a storage data area. The storage program area may store an operating system, application programs required for implementing the foregoing user-adjustable intelligent recommendation method, and the like. The data storage area may store list information of the terminal, data generated when the terminal performs the foregoing user-adjustable intelligent recommendation method, and the like. In addition, the memory 2120 may include a volatile memory, for example, a random-access memory (RAM). The memory 2120 may also include a non-volatile memory, for example, a read-only memory (ROM), a flash memory, a hard disk drive (HDD), or a solid-state drive (SSD). The memory 2120 may further include a combination of the foregoing types of memories.

The input unit 2130 may be configured to receive digital or character information input by a user, including an operation to turn on a WLAN hotspot, an operation to select a terminal sharing a WLAN hotspot, and the like. Specifically, the input unit 2130 may include a touch panel 2131 and another input device 2132. The touch panel 2131, also referred to as a touchscreen, may collect a touch operation (for example, an operation performed by a user on the touch panel 2131 or near the touch panel 2131 by using any proper object or accessory such as a finger or a stylus) performed by the user on or near the touch panel, and drive a corresponding connection apparatus based on a preset program. Optionally, the touch panel 2131 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch coordinates, then sends the touch coordinates to the processor 2150, and can receive and execute a command sent by the processor 2150. In addition, the input unit 2130 may implement the touch panel 2131 in a plurality of types, such as a resistive type, a capacitive type, an infrared type, and a surface acoustic wave type. In addition to the touch panel 2131, the input unit 2130 may also include another input device 2132.

Specifically, the another input device 2132 may include but is not limited to one or more of a physical keyboard, a function key (for example, a volume control key or an on/off key), a trackball, a mouse, a joystick, and the like.

The display unit 2140 may be configured to display information that is input by the user or information provided for the user, and various menus of the terminal. The display unit 2140 may include a display screen 2141. Optionally, the display screen 2141 may be configured in a form such as a liquid crystal display (LCD) or an organic light-emitting diode (OLED). Further, the touch panel 2131 may cover the display screen 2141. When the touch panel 2131 detects the touch operation performed on or near the touch panel, the touch panel transmits the touch operation to the processor 2150 to determine a type of a touch event, and then the processor 2150 provides a corresponding visual output on the display screen 2141 based on the type of the touch event. Although the touch panel 2131 and the display screen 2141 in FIG. 3 are used as two independent components to implement input and input functions of the terminal, in some embodiments, the touch panel 2131 and the display screen 2141 may be integrated to implement the input and output functions of the terminal.

The processor 2150 is a control center of the terminal, connects various parts of the terminal by using various interfaces and lines, runs or executes software programs and/or modules stored in the memory 2120, and invokes data stored in the memory 2120. Optionally, the processor 2150 may include one or more processing units. Preferably, an application processor and a modem processor may be integrated into the processor 2150. The application processor mainly processes an operating system, a user interface, an application program, and the like. The modem processor mainly handles wireless communication. It may be understood that the modem processor may be not integrated into the processor 2150.

The WLAN module 2160 may be configured to help the user send and receive an email, browse web pages, access streaming media, and the like. It provides the user with wireless broadband WLAN internet access. A WLAN is a short-distance wireless transmission technology. The terminal may access the WLAN hotspot by using the WLAN module 2160, or may enable the WLAN hotspot by using the WLAN module 2160, to forward the mobile bandwidth service to another terminal. The WLAN module 2160 may further perform Wi-Fi broadcast and scanning, to implement wireless communication with another surrounding terminal.

The terminal further includes the power supply 2170 (for example, a battery) that supplies power to each component. Optionally, the power supply may be logically connected to the processor 2150 by using a power management system, to manage functions such as charging, discharging, and power consumption by using the power management system.

The Bluetooth module 2170 may be a Bluetooth low energy (BLE) device, or may be a conventional Bluetooth device, or may be a dual-mode Bluetooth device that supports conventional Bluetooth and the BLE. The Bluetooth module 2170 establishes a BLE connection or a classic Bluetooth connection to a Bluetooth module of another terminal, and the Bluetooth module 2170 may further perform BR or BLE broadcast and scanning, to implement wireless communication with another surrounding terminal.

Although not shown, the terminal may further include a camera, a loudspeaker, and the like, and details are not described herein.

For example, the RF circuit 2110, the Bluetooth module 2180, and the WLAN module 2160 may be collectively referred to as a wireless communications interface.

For example, the terminal includes the processor 2150, the memory 2120, the display unit 2140, the input device, and the wireless communications interface. The memory 2120 is configured to store a program instruction. When executed by the processor 2150, the program instruction stored in the memory 2120 is used to perform the following operations: instructing the display unit 2140 to display a user interface, where the user interface displays options of modifiable recommendation parameters of recommended content; instructing the input device 2130 to receive a first operation that is input by the user; instructing the display unit 2140 to display a first modification interface in response to a first operation that is input by the user for the options, where the first operation is used to request to display the first modification interface, and the first modification interface displays a plurality of recommendation parameters; instructing the input device 2130 to receive a second operation that is input by the user, where the second operation is used to modify at least one of the plurality of recommendation parameters; instructing the wireless communications interface (one of the RF circuit 2110, the Bluetooth module 2180, and the WLAN module 2160) to send a first modification request to a first server, where the second operation is used to modify the at least one of the plurality of recommendation parameters, and the first modification request is used to request the server to modify the at least one recommendation parameter; instructing the wireless communications interface to send a recommendation request to the server; instructing the wireless communications interface to receive recommended content from the server, where the recommended content is determined based on a plurality of recommendation parameters; and instructing the displaying unit 2140 to display the recommended content.

For example, the plurality of recommendation parameters include at least one recommendation parameter modified based on a modification operation that is input by the user.

For example, each of the plurality of recommendation parameters corresponds to a feature value and a feature weight of a feature, and the feature is a user feature or a content feature of candidate content.

For example, the first modification interface includes a plurality of areas, and there are a plurality of boundaries between the plurality of areas. Each of the plurality of areas corresponds to one feature, and a size of each of the plurality of areas corresponds to the feature weight of the feature. The second operation includes an operation of moving at least one of the plurality of boundaries, and the first modification request specifically includes: modifying a feature weight of a feature associated with the at least one boundary. An intuitive interface facilitates the user to modify the weight.

For example, the first modification interface includes a plurality of areas. When executed by the processor 2150, the program instruction stored in the memory is used to perform the following operations: instructing the input device 2130 to receive a third operation that is input by the user after the display unit 2140 displays the first modification interface; and instructing the display unit 2140 to display a second modification interface in response to a third operation that is input by the user, where the third operation is used to instruct to activate an area in the plurality of areas, and the second modification interface displays a feature value modification range of a feature corresponding to the area.

For example, the second operation includes an operation of selecting a target range from the feature value modification range of the feature corresponding to the area. When executed by the processor 2150, the program instruction stored in the memory is further used to perform the following operation: modifying the feature value of the feature corresponding to the area to the target range.

In an example, the user inputs the first modification operation by using the display screen 2141 of the mobile phone. The display screen 2141 of the mobile phone displays the first modification interface. The user modifies the weight on the first modification interface on the display screen 2141. The processor 2150 of the mobile phone sends the modified feature weight to the server by using the RF circuit 2110. After the modification, the user inputs an operation of the recommended content by using the display screen 2141 of the mobile phone. The processor 2150 of the terminal sends, by using the RF circuit 2110, a request for obtaining the recommended content to the server, receives the recommended content of the server by using the RF circuit, and displays the recommended content to the user on the display screen 2141.

In an example, the user inputs the first modification operation by using the display screen 2141 of the mobile phone. The display screen 2141 of the mobile phone displays the first modification interface. The user inputs a third modification operation through the first modification interface on the display screen 2141, and the display screen 2141 displays the second modification interface. The user modifies the feature value on the second modification interface. The processor 2150 of the mobile phone sends the modified feature weight to the server by using the RF circuit 2110. After the modification, the user may input an operation of the recommended content by using the display screen 2141 of the mobile phone. The processor 2150 of the terminal sends, by using the RF circuit 2110, a request for obtaining the recommended content to the server, receives the recommended content of the server by using the RF circuit, and displays the recommended content to the user on the display screen 2141.

An embodiment of the present application provides an intelligent recommendation method. The following describes an example in which a terminal is a mobile phone with reference to FIG. 4 to FIG. 12. The method may include the following steps.

Step 1010: The terminal displays a user interface of recommended content, and the user interface displays an option of a recommendation parameter modifiable by a user. The user interface may be a user interface shown in FIG. 4, and the option may be "recommendation modification" 405.

Step 1011: When the terminal receives a first operation that is input by a user for the option, the terminal displays a first modification interface.

The first operation is an operation that is received by the terminal for displaying the first modification interface. In an example, the first modification interface includes a plurality of areas, and each area corresponds to one feature. In an example, a feature has two parameters: a feature value and a feature weight. A size of an area may correspond to a feature weight of a feature. The feature may be a user feature, or may be a content feature of candidate content. In an example, the first modification interface may be a weight modification diagram, and is used to modify a weight of a feature.

Figure 4:
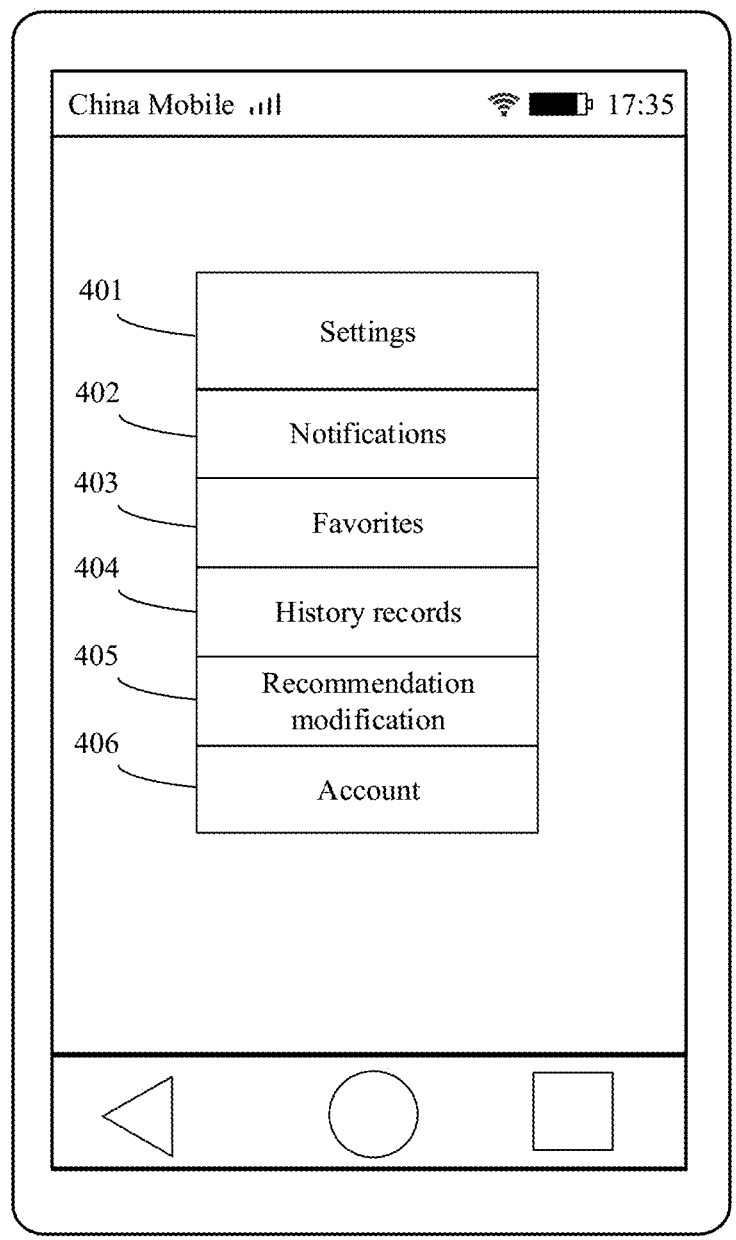
FIG. 4 is a schematic diagram of a window for entering a modification interface according to an embodiment of the present application.

In an example, the first operation is an operation of clicking "recommendation modification" 405 shown in FIG. 4.

Figure 5:
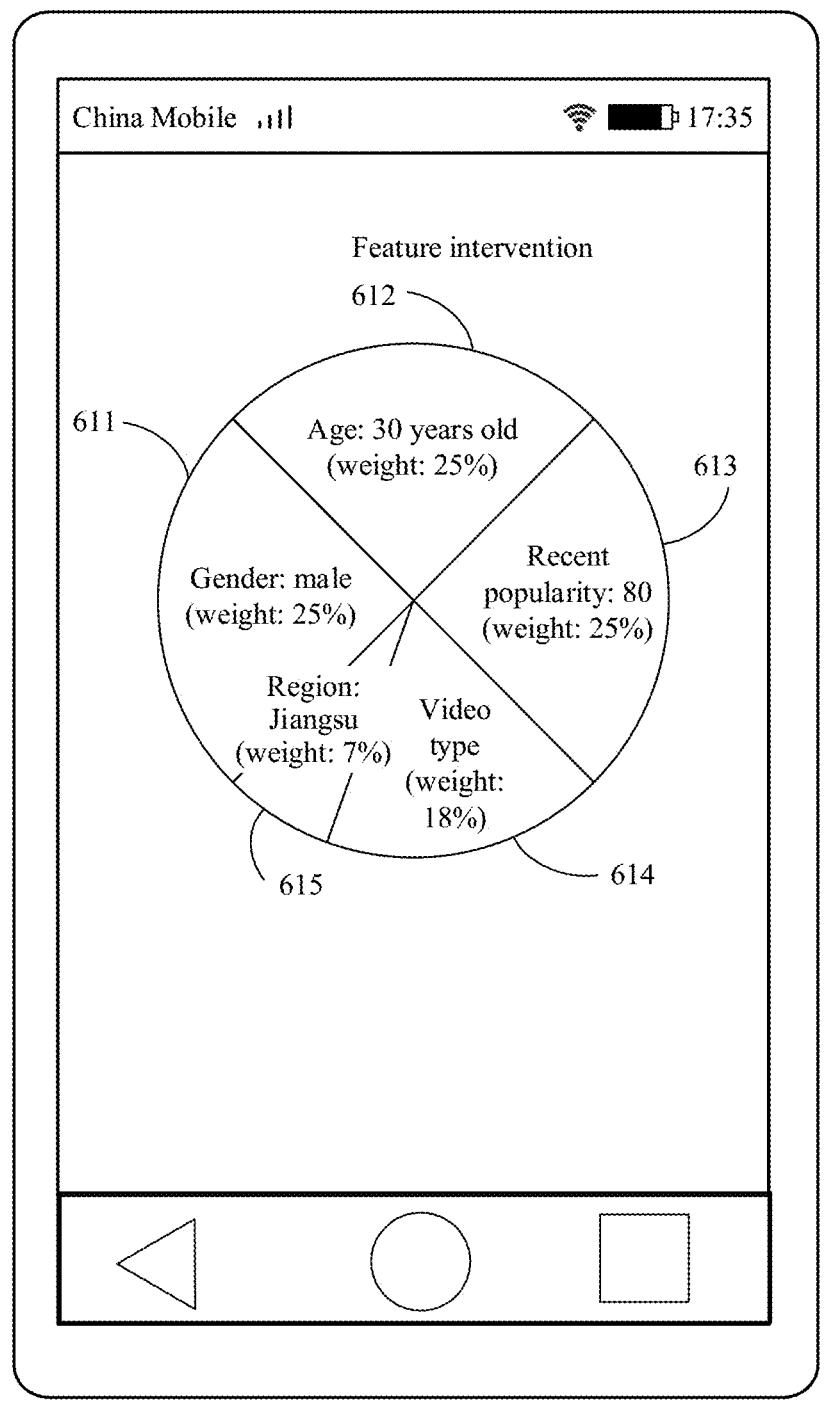
FIG. 5 is a schematic diagram of a first modification interface according to an embodiment of the present application.

In an example, the first modification interface may be a pie chart shown in FIG. 5. For example, in FIG. 5, five areas of the first modification interface show five feature parameters, namely, a gender 611, an age 612, recent popularity 613, a video type 614, and a region 615. A size of each sector area may represent a feature weight of a feature corresponding to the sector area. For example, a feature of the region 615 is Jiangsu, and its weight is 7%.

Figure 6:
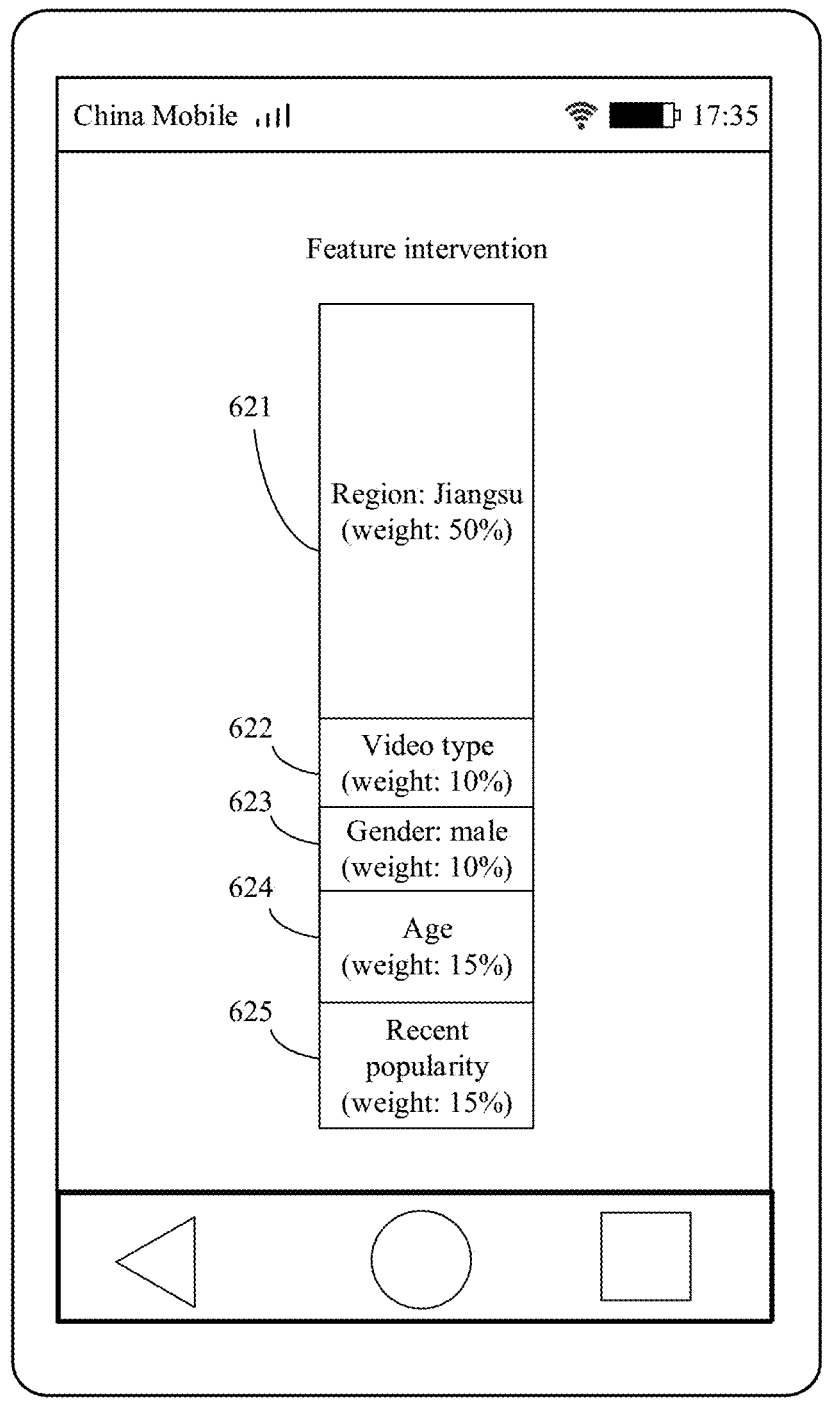
FIG. 6 is a schematic diagram of another first modification interface according to an embodiment of the present application.

The pie chart of the first modification interface shown in FIG. 5 is only an example, and it may also be a chart in another form, for example, a bar chart shown in FIG. 6. The bar chart shown in FIG. 6 includes five bar charts: a region 621, a video type 622, a gender 623, an age 624, and recent popularity 625. A size of a bar chart may be used to represent a feature weight of a feature. The five feature parameters in the weight modification diagrams shown in FIG. 5 and FIG. 6 are merely examples. According to an actual application requirement, a quantity of feature parameters may be changed, and correspondingly a quantity of areas corresponding to the feature parameters may also be changed.

Step 1012: When the terminal receives a second operation that is input by the user, the terminal sends a first modification request to the first server.

In an example, the second operation is an operation that is received by the terminal for modifying the feature weight. After receiving the second operation, the terminal sends a first modification request to the first server. The first modification request is used to modify a feature weight stored in a second server.

Figure 7:
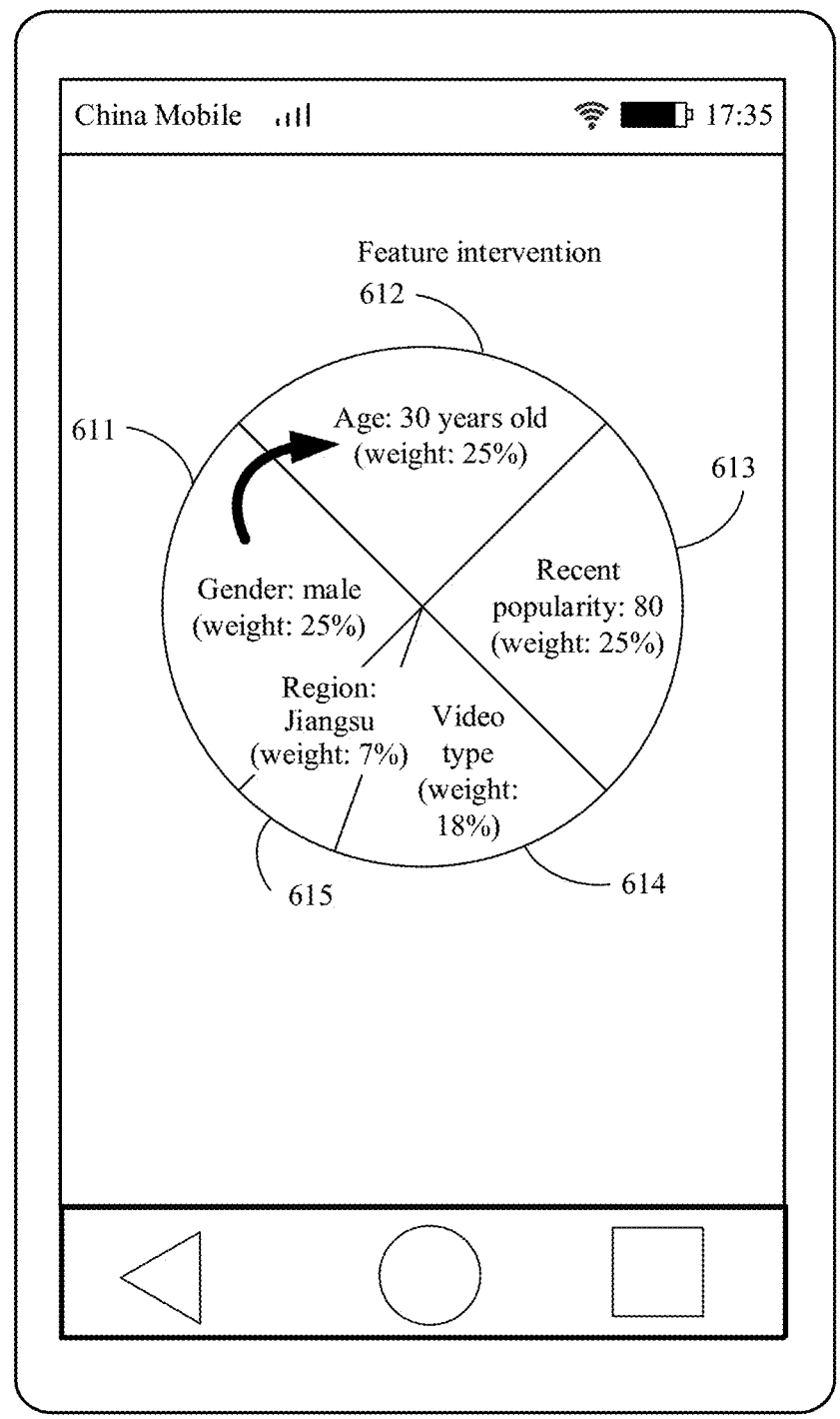
FIG. 7 is a schematic diagram of modifying a feature weight in FIG. 5 according to an embodiment of the present application.

In an example, FIG. 7 is a schematic diagram of modifying the feature weights of the age 612 and the gender 611 shown in FIG. 5. As shown in FIG. 7, a boundary between the age 612 and the gender 611 is rotated, and a rotation direction is from the gender 611 to the age 612. For example, after the boundary is rotated, the weight of age 612 (30 years old) decreases from 25% to 15%, and the weight of gender 611 (male) increases from 25% to 35%.

Figure 8:
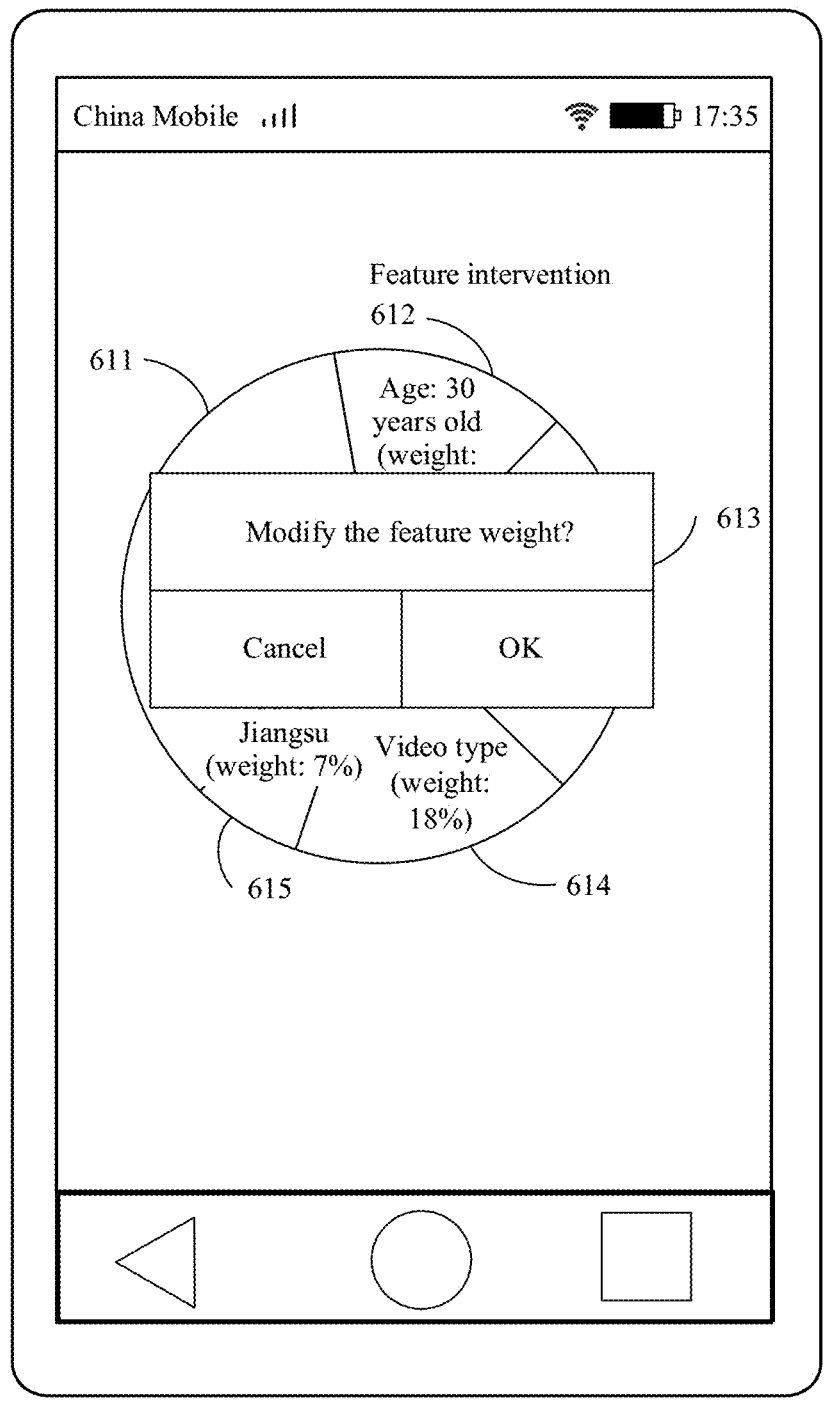
FIG. 8 is a schematic diagram of a confirmation interface after a weight is modified according to an embodiment of the present application.

After the operation shown in FIG. 7, the terminal displays a confirmation interface shown in FIG. 8.

After receiving an operation of confirmation, the terminal sends, to the first server, a request for modifying the feature weights of the age 612 and the gender 611.

When content modified by the user includes a feature value, step 1013 and step 1014 are further included.

Step 1013: When the terminal receives a third operation that is input by the user, the terminal displays a second modification interface.

In an example, the third operation is an operation that is received by the terminal for displaying a second modification interface, and the second modification interface includes a modification range of a feature value.

Figure 10:
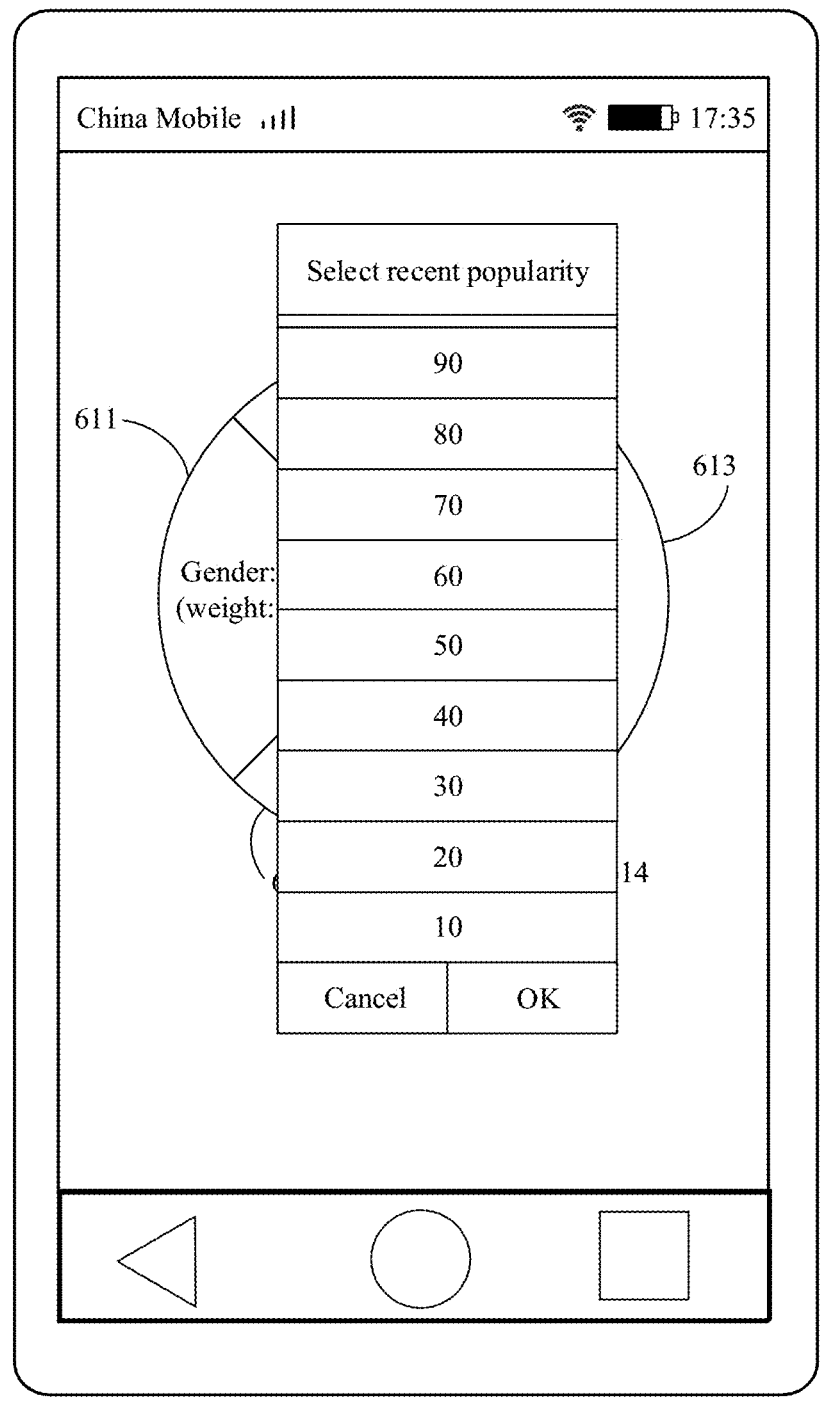
FIG. 10 is a schematic diagram of a second modification interface according to an embodiment of the present application.

In an example, after receiving an operation of clicking the recent popularity 613 area in FIG. 5, the terminal displays a modification interface of the feature values, as shown in FIG. 10. In FIG. 10, the modification interface of the feature values includes a plurality of modification values of the recent popularity 613 in FIG. 5. The recent popularity before the operation of clicking is 80. After the operation of clicking, a value of the recent popularity can be selected from 10 to 90 as required. The second modification interface displayed in step 1013 may be invoked from the first modification interface shown in FIG. 5, or may be invoked from another interface according to an actual application requirement.

Step 1014: When the terminal receives a fourth operation that is input by the user, the terminal sends a second modification request to the first server.

In an example, the fourth operation is an operation that is received by the terminal for modifying the feature value.

After receiving the fourth operation, the terminal sends a second modification request to the first server. The second modification request is used to modify a feature value stored in the second server.

In an example, the second modification interface shown in FIG. 10 further includes "OK" and "cancel" options, and after "20" and the "OK" in FIG. 10 are clicked, the terminal sends, to the first server, a request for modifying the feature value of the recent popularity 613.

Steps 1011 and 1012 are used to modify the feature weight, and steps 1013 and 1014 are used to modify the feature value. Different steps may be selected based on content to be modified. When both the feature weight and the feature value are modified, steps 1011 and 1012, and steps 1013 and 1014 may not be subject to a specific sequence. Steps 1011 and 1012 may be first performed to modify the feature weight, and then steps 1013 and 1014 are performed to modify the feature value. Alternatively, steps 1013 and 1014 may be first performed to modify the feature value, and then steps 1011 and 1012 are performed to modify the feature weight.

Step 1015: The first server sends a modified recommendation parameter to the second server.

The first server sends the recommendation parameter modified by the user to the second server, where the recommendation parameter may be a feature weight or a feature value, or may include both a feature weight and a feature value.

In an example, in the embodiment in which the feature weights of the age 612 and the gender 611 are modified in FIG. 8, the first server sends the feature weights of the age 612 and the gender 611 to the second server.

In an example, in the embodiment in which the feature value of the recent popularity 613 is modified in FIG. 10, the first server sends the feature value of the recent popularity 613 to the second server.

Step 1016: The second server stores the modified recommendation parameter.

The second server stores the modified recommendation parameter, where the recommendation parameter may be a feature weight or a feature value, or may include both a feature weight and a feature value.

In an example, in the embodiment of FIG. 8, the second server stores feature weights of the age 612 and the gender 611.

In an example, in the embodiment of FIG. 10, the second server stores the feature value of the recent popularity 613.

Step 1017: The terminal receives a message that indicates that the modification is successful and that is sent by the first server.

Step 1018: The terminal displays a modified first modification interface or the second modification interface.

Figure 9:
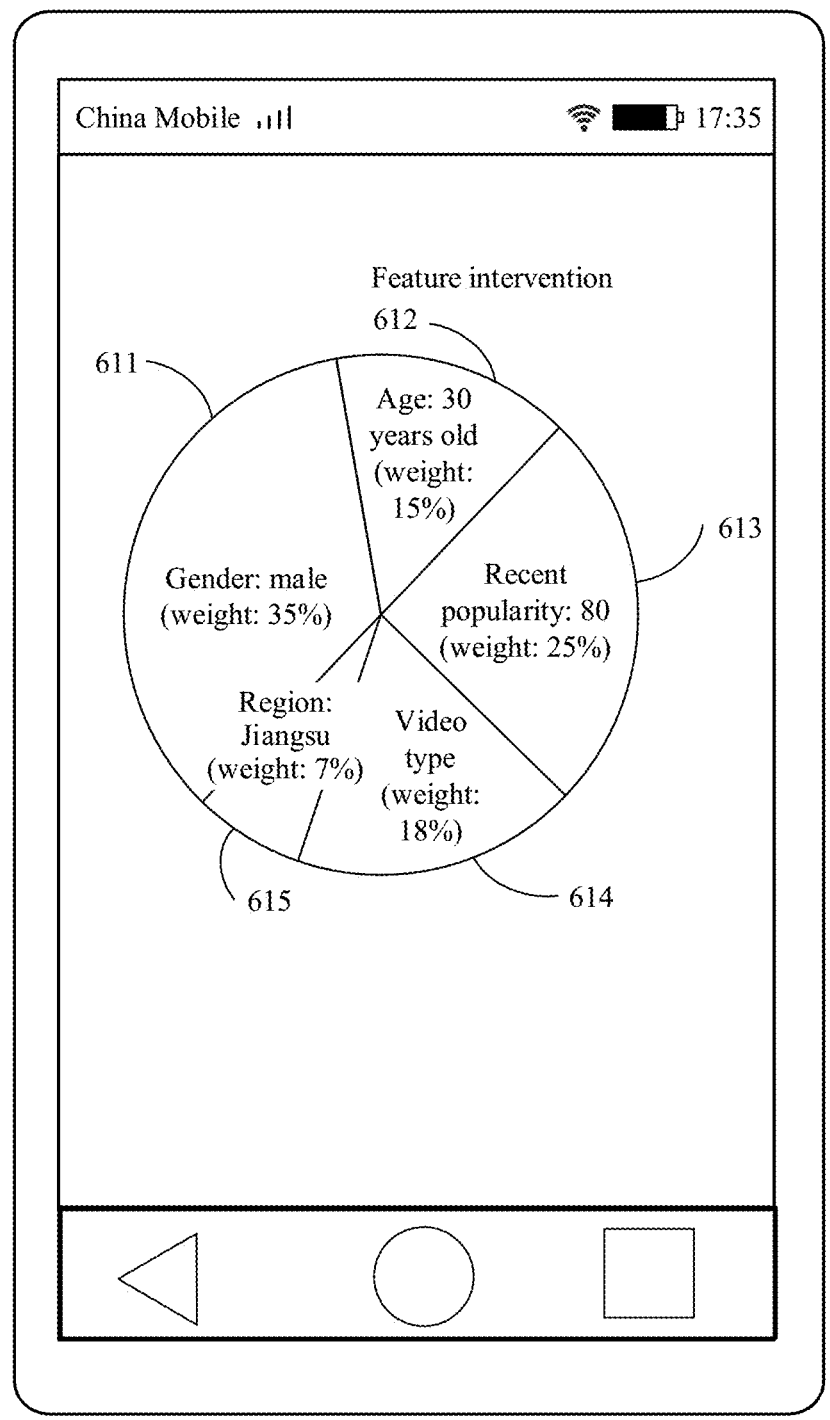
FIG. 9 is a schematic diagram of an interface after a feature weight in FIG. 7 is successfully modified according to an embodiment of the present application.

In an example, in a case of FIG. 8, after receiving a message that is sent by the first server for indicating that the feature weight is successfully modified, the terminal displays the modified first modification interface shown in FIG. 9. Compared with FIG. 5, in FIG. 9, the feature weight of age 612 is reduced to 15%, and the feature weight of gender 611 is increased to 35%.

Figure 11:
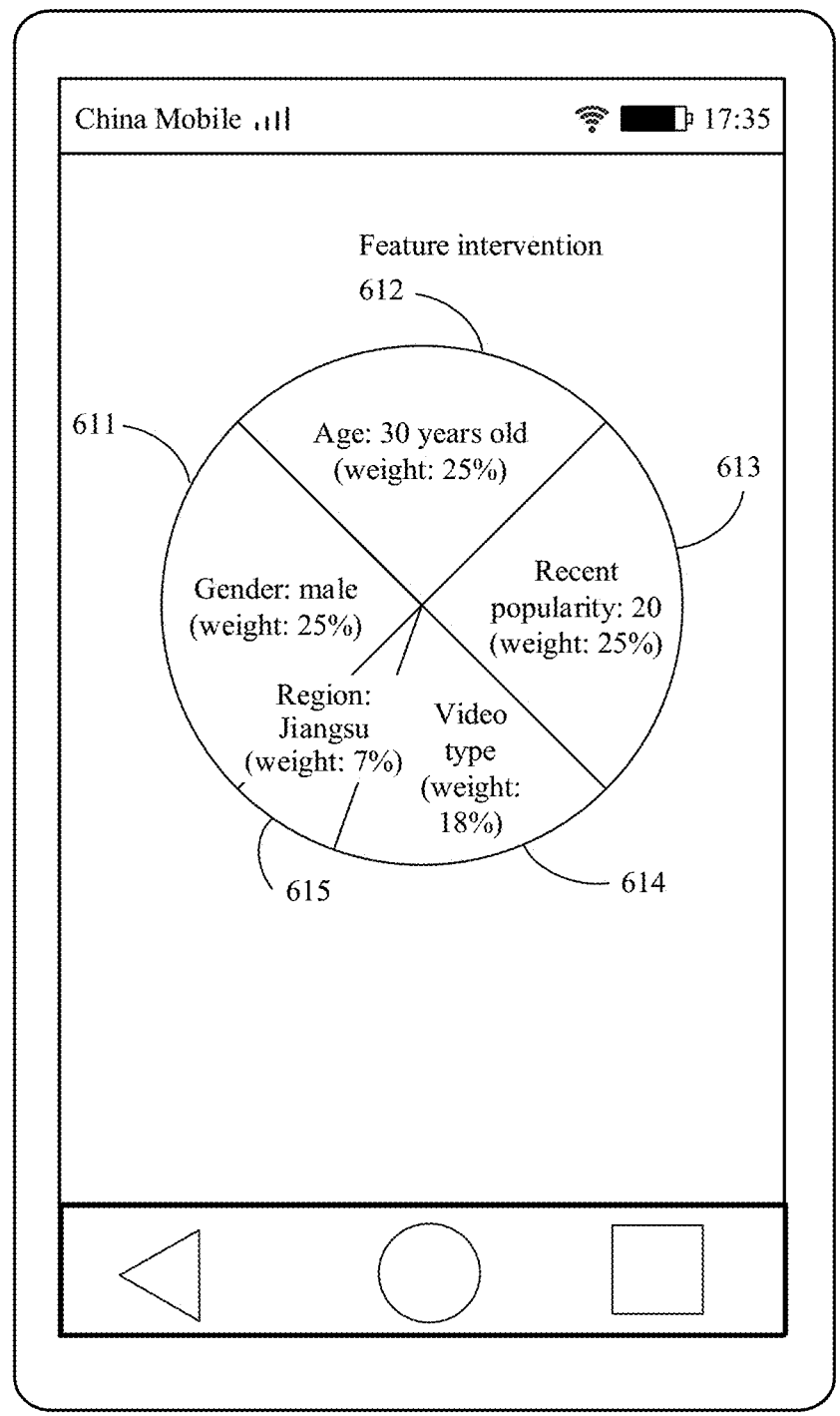
FIG. 11 is a schematic diagram of an interface after feature value in FIG. 10 is successfully modified according to an embodiment of the present application.
Figure 12:
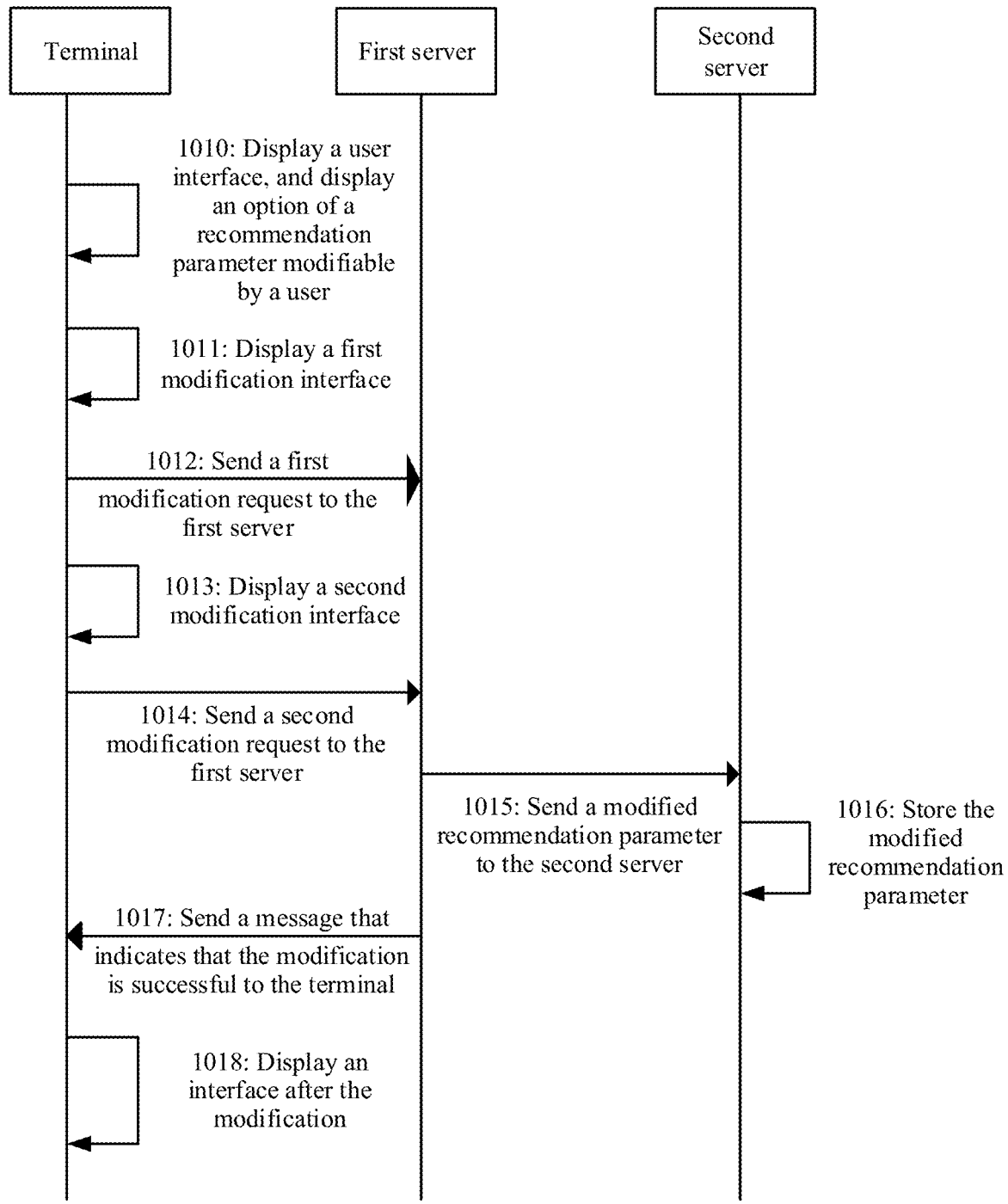
FIG. 12 is a schematic flowchart of interaction between a terminal and a server in a modification process according to an embodiment of the present application.

In an example, in a case of FIG. 10, after receiving a message that is sent by the first server for indicating that the feature value is successfully modified, the terminal displays the modified second modification interface shown in FIG. 11. Compared with FIG. 5, the feature value of the recent popularity 613 in FIG. 11 is modified from "80" to "20".

After the recommendation parameter is modified, a recommendation operation can be performed.

Figure 13:
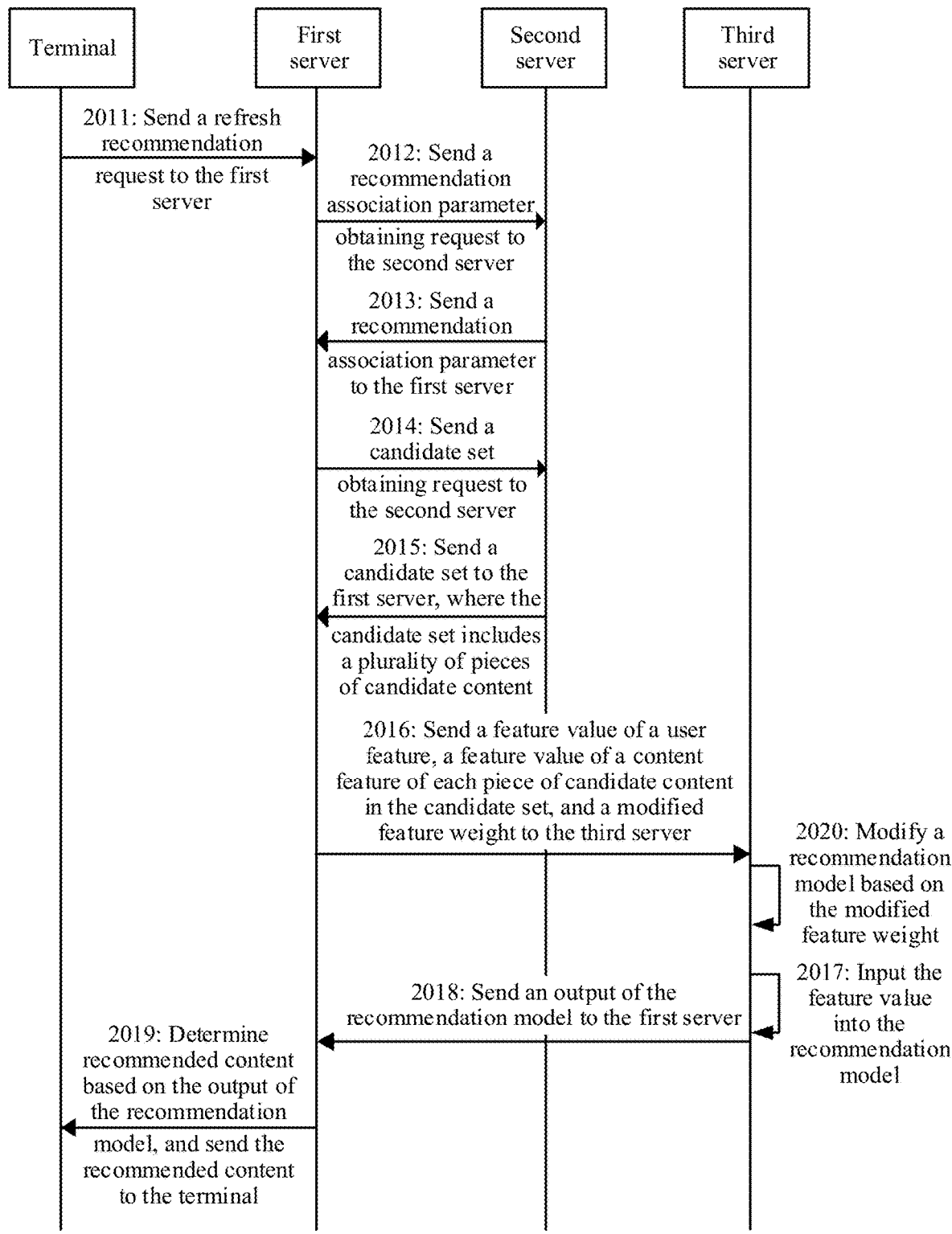
FIG. 13 is a schematic flowchart of interaction between a terminal and a server in a recommendation phase according to an embodiment of the present application.

FIG. 13 is a schematic flowchart of interaction between a terminal and a server in a recommendation phase according to an embodiment of the present application. As shown in FIG. 13, the following steps are included:

Step 2011: The terminal sends a recommendation request to the first server, where the request is used to obtain a plurality of recommendation parameters.

For example, the recommendation parameters include at least one recommendation parameter modified based on a modification operation that is input by the user.

Step 2012: The first server sends a recommendation parameter obtaining request to the second server.

The recommendation parameter obtained by the first server may include each feature value that affects a recommendation result. When the parameter modified by the user includes the feature weight, the obtained recommendation parameter further includes the modified feature weight.

When the user modifies only the feature value, the first server obtains each feature value that affects the recommendation result.

When the user modifies only the feature weight, or modifies both the feature value and the feature weight, the first server further obtains the modified feature weight in addition to obtaining the feature value that affects the recommendation result.

Step 2013: The second server sends a recommendation parameter to the first server.

The recommendation parameter may include each recommendation parameter that is modified based on a modification operation of the user.

Step 2014: The first server sends a candidate set obtaining request to the second server.

The first server obtains a corresponding candidate set based on a feature value of a content feature of candidate content in a recommendation association parameter, where the candidate set includes a plurality of pieces of candidate content. For example, in a video application, recent popularity of a feature is 20, and the server obtains a candidate set of some older movies, for example, a candidate set that includes 10 movies of the 1990s.

Step 2015: The second server sends a candidate set to the first server, where the candidate set includes a plurality of pieces of candidate content.

Step 2016: The first server sends the feature value obtained from the second server to the third server.

If the parameter modified by the user does not include the feature weight, the first server sends to the third server only a feature value. For example, age 612 is "30", a region 615 is "Jiangsu", and feature values of each movie in the candidate set including the 10 movies of the 1990s are a director, an actor, and a movie type.

In an example, in the embodiments of FIG. 10 and FIG. 11, the first server obtains feature values that affect a recommendation result, and sends them to the third server. For example, recent popularity 613 modified by the user is "20", a region 615 that is not modified is "Jiangsu", and the feature values of each movie in the candidate set including the 10 movies of the 1990s are a director, an actor, and a movie type.

If the parameter modified by the user includes the feature weight, in addition to the feature value, the first server further sends the modified feature weight to the third server.

In an example, in the embodiments of FIG. 8, FIG. 9, and FIG. 10, in addition to the feature values, the first server further sends the modified feature weights of the age 612 and the gender 611 to the third server.

Step 2017: The third server inputs the feature value into a recommendation model.

If the user does not modify the feature weight, the third server directly inputs the feature value into the recommendation model, to obtain output of the recommendation model.

Step 2020 may be further included before step 2017. Details are as follows:

Step 2020: The third server modifies the recommendation model based on the modified feature weight.

If the feature weight is modified by the user, the feature weight is changed, so that an original recommendation model is no longer applicable. The recommendation model is modified first, and then step 2017 is performed and the feature value is input, to obtain the output of the recommendation model.

Step 2018: The third server sends the output of the recommendation model to the first server.

Step 2019: The first server determines recommended content based on the output of the recommendation model, and sends the recommended content to the terminal.

After step 2019, the following steps are included:

The terminal displays the recommended content.

The recommended content also changes due to the modification of at least one recommendation parameter.

Figures 14A, 14B:
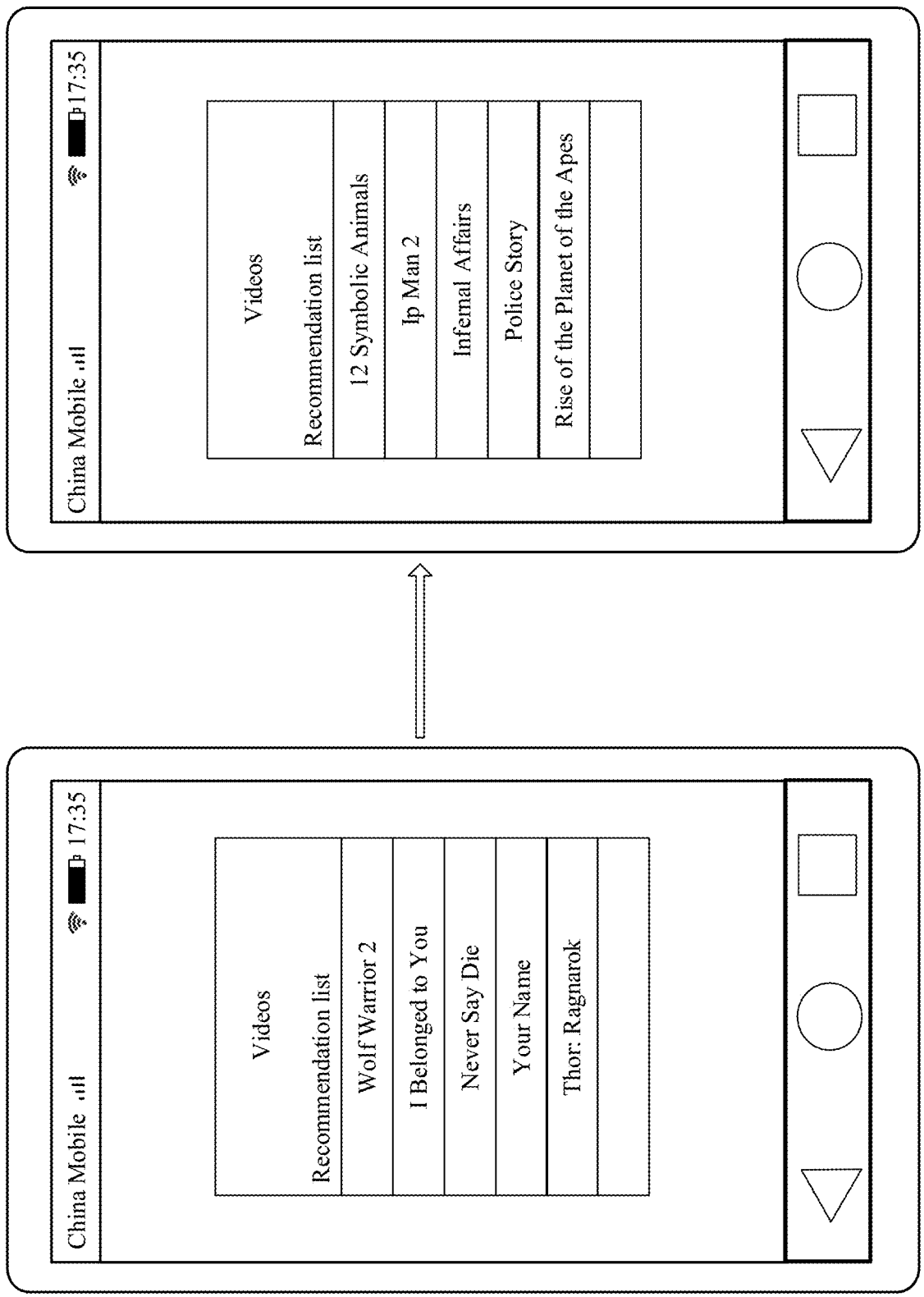
FIG. 14a and FIG. 14b show a change of a recommendation list according to an embodiment of the present application.

In an example, FIG. 14a and FIG. 14b show a change of a recommendation list of movies on a mobile phone when the feature value of the recent popularity 613 in FIG. 11 is modified from "80" to "20". FIG. 14a shows recommended content before a recommendation parameter is modified, and FIG. 14b shows recommended content returned by a server after the feature value of recent popularity 613 is modified. As can be seen, after the user modifies the recommendation parameters, a proportion of the recent popularity decreases significantly, so that the recommended content of a video application recommendation tends to include a relatively large quantity of old movies.

Figure 15B:
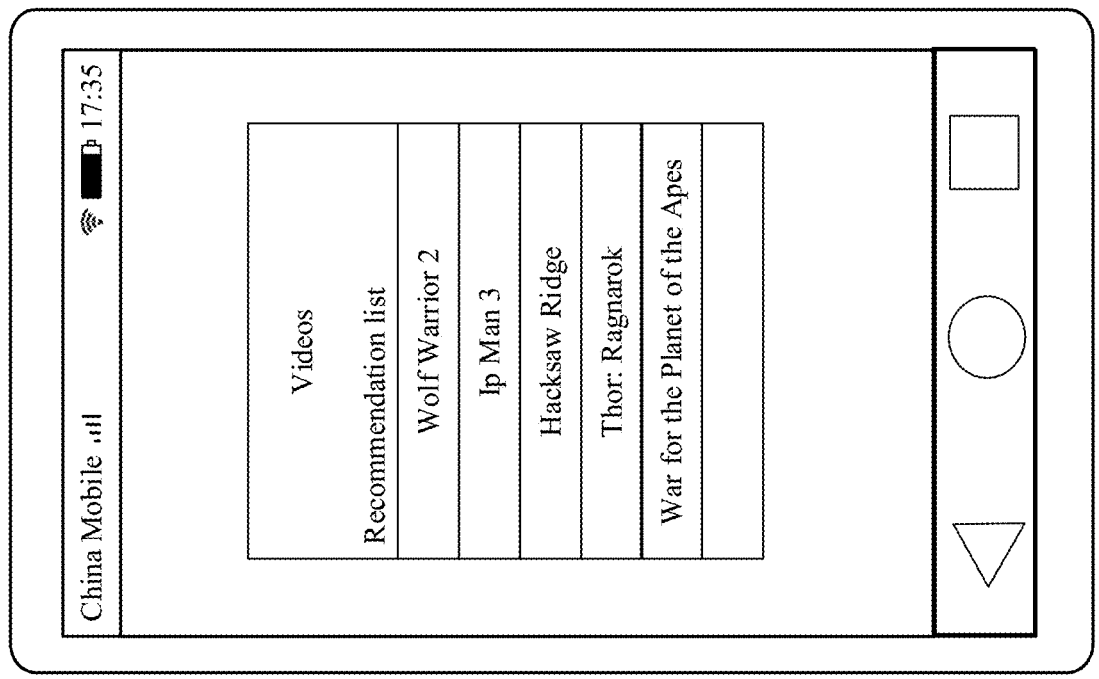
FIG. 15a and FIG. 15b show another change of a recommendation list according to an embodiment of the present application.
Figure 15A:
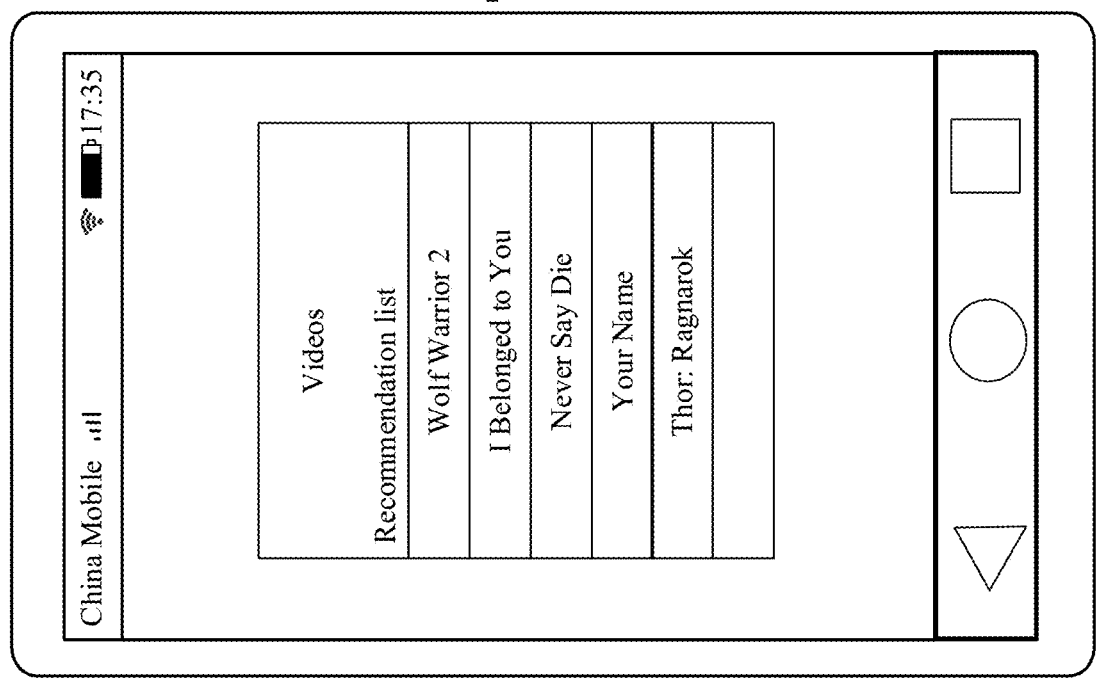

In an example, FIG. 15a and FIG. 15b show a change of a recommendation list of movies on the mobile phone when the feature weight of age 612 in FIG. 9 is reduced to 15% and the feature weight of gender 611 is increased to 35%. FIG. 15a shows recommended content before a recommendation parameter is modified, and FIG. 15b shows recommended content returned by the server after the feature weights of the age 612 and the gender 611 are modified. As can be seen, after the user modifies the recommendation parameter, a proportion of gender (male) increases, so that the recommend content of the video application recommendation tends to be that males like to watch.

Figures 16A, 16B:
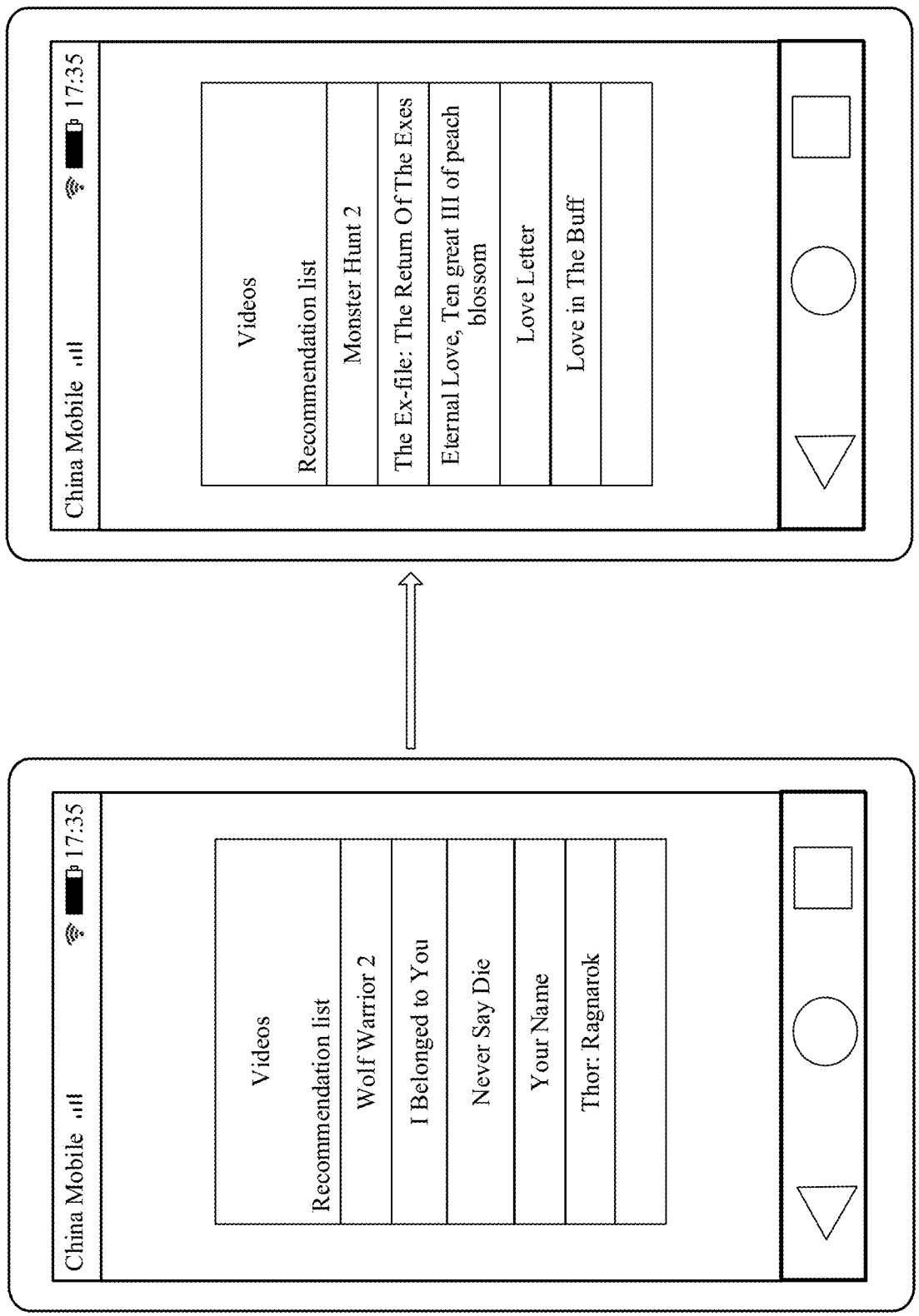
FIG. 16a and FIG. 16b show another change of a recommendation list according to an embodiment of the present application.

In an example, FIG. 16a and FIG. 16b show a change of a recommendation list of movies on the mobile phone when the gender 611 is modified from "male" to "female", the weight of the age 612 is modified to 10%, and the weight of the recent popularity 613 is increased to 40% in FIG. 5. FIG. 16a shows recommended content before a recommendation parameter is modified, and FIG. 16b shows recommended content returned by the server after the feature weights of the age 612 and the recent popularity 613 are modified. As can be seen, after the user modifies the recommendation parameter, the recommend content of the video application recommendation tends to be that females like to watch and is of a new generation.

The foregoing describes in detail the intelligent recommendation method in the embodiments of the present application with reference to FIG. 4 to FIG. 16. The following describes in detail a terminal and a server provided in the embodiments of the present application with reference to FIG. 17 to FIG. 19.

Figure 17:
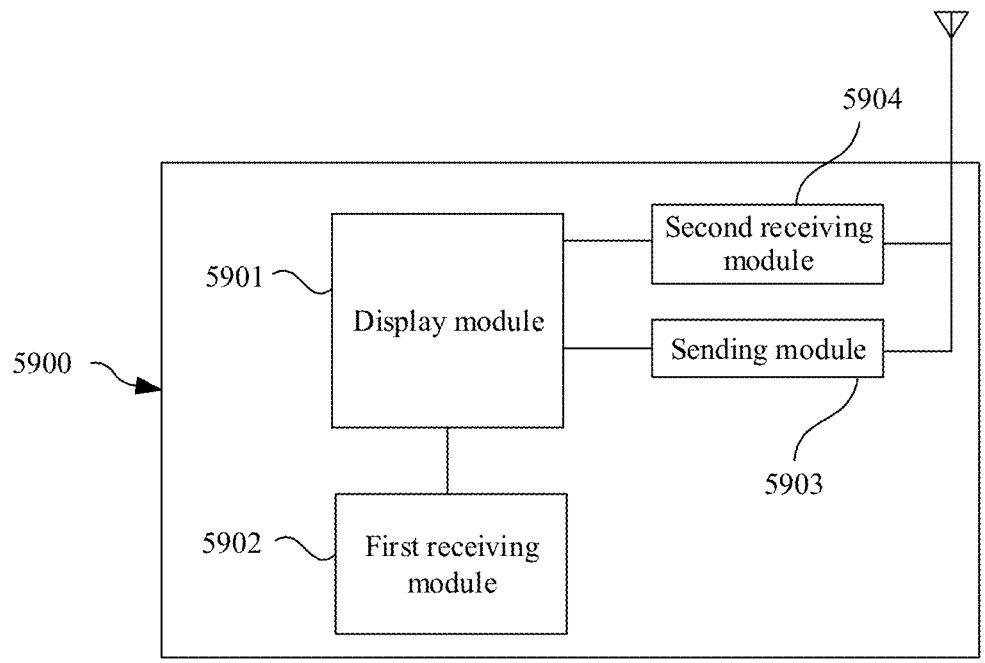
FIG. 17 is a schematic structural diagram of another terminal according to an embodiment of the present application.

FIG. 17 is a schematic structural diagram of a terminal according to an embodiment of the present application. A terminal 5900 may include a display module 5901, a first receiving module 5902, a sending module 5903, and a second receiving module 5904.

A person skilled in the art may understand that FIG. 17 shows only a simplified design of a structure of the terminal. The structure of the terminal shown in FIG. 17 does not constitute a limitation on the terminal. The terminal may include more or fewer components than those shown in FIG. 17.

In FIG. 17, the display module 5901 displays a user interface of recommended content, and the user interface displays an option of a recommendation parameter modifiable by a user. The display module 5901 is configured to display a first modification interface in response to a first modification operation that is input by the user by using the first receiving module 5902 for the options, where the first modification operation is used to request to display the first modification interface, and the first modification interface displays a plurality of recommendation parameters. The first receiving module 5902 is configured to receive a second modification operation that is input by the user, where the second modification operation is used to modify at least one of the plurality of recommendation parameters. The sending module 5903 sends a modification request to the server based on the second modification operation, where the modification request is used to request the server to modify the at least one recommendation parameter. The second receiving module 5904 is configured to receive recommended content from the server and the recommended content is determined based on a plurality of recommendation parameters. The display module 5901 is further configured to display the recommended content.

For example, the plurality of recommendation parameters include at least one recommendation parameter modified based on a modification operation that is input by the user.

For example, each of the plurality of recommendation parameters corresponds to a feature value and a feature weight of a feature, and the feature is a user feature or a content feature of candidate content.

For example, the first modification request specifically includes: modifying a feature value and/or a feature weight of the feature.

For example, the first modification interface includes a plurality of areas, and there are a plurality of boundaries between the plurality of areas. Each of the plurality of areas corresponds to one feature, and a size of each of the plurality of areas corresponds to the feature weight of the feature. The second operation includes an operation of moving at least one of the plurality of boundaries, and the first modification request specifically includes: modifying a feature weight of a feature associated with the at least one boundary. An intuitive interface facilitates the user to modify the weight.

For example, the first modification interface includes a plurality of areas. After the display module 5901 displays the first modification interface, the first receiving module 5902 is further configured to receive a third operation that is input by the user. The display module 5901 is further configured to: display a second modification interface in response to a third operation that is input by the user, where the third operation is used to instruct to activate an area in the plurality of areas, and the second modification interface displays a feature value modification range of a feature corresponding to the area.

For example, the second operation includes an operation of selecting a target range from the feature value modification range of the feature corresponding to the area, and the modification request specifically includes: modifying the feature value of the feature corresponding to the area to the target range.

For example, the sending module 5903 sends the recommendation request to the server. The second receiving module 5904 receives recommended content sent by the server, where the recommended content is determined by the server based on a plurality of modified recommendation parameters. The displaying module 5901 displays the recommended content.

An interface opened to a user is added to a recommendation process of the terminal according to this embodiment of the present application, so that the user can participate in the intelligent recommendation process through the interface and modify a feature value and a feature weight, a recommendation offset caused by unexpected and temporary browsing can be corrected, providing more accurate and personalized experience.

Figure 18:
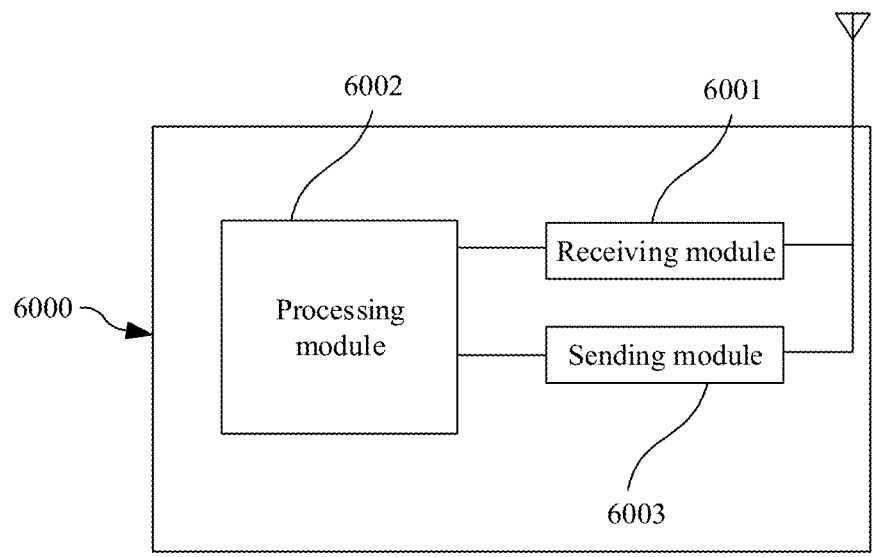
FIG. 18 is a schematic structural diagram of a server according to an embodiment of the present application.

FIG. 18 is a schematic structural diagram of a server according to an embodiment of the present application. The server 6000 may include a receiving module 6001, a processing module 6002, and a sending module 6003.

A person skilled in the art may understand that FIG. 18 shows only a simplified design of a structure of the server. The structure of the server shown in FIG. 18 does not constitute a limitation on the server. The server may include more or fewer components than those shown in FIG. 18.

In FIG. 18, the receiving module 6001 receives a modification request of the terminal, where the modification request is sent based on a modification operation that is input by a user, and the modification operation from the user is used to instruct to modify at least one recommendation parameter. The processing module 6002 is configured to modify the at least one recommendation parameter based on the modification request.

For example, the receiving module 6001 further receives a recommendation request of the terminal. The processing module 6002 obtains a plurality of recommendation parameters based on the recommendation request, and determines recommended content based on the plurality of recommendation parameters. The sending module 6003 sends the recommended content to the terminal.

For example, the plurality of recommendation parameters include at least one recommendation parameter modified based on a modification operation that is input by the user.

For example, each of the plurality of recommendation parameters corresponds to a feature value and a feature weight of a feature, and the feature is a user feature or a content feature of candidate content.

For example, the processing module 6002 obtains a candidate set based on feature values of content features in the plurality of recommendation parameters, where the candidate set includes a plurality of pieces of candidate content. The processing module 6002 inputs the feature value of the user feature and the feature values of the content features of the candidate content in the candidate set into a recommendation model. The processing module 6002 determines the recommended content based on an output of the recommendation model.

For example, when the at least modified recommendation parameter further includes feature weights of the features, before the processing module 6002 inputs the feature value of the user feature and the feature values of the content features of the candidate content in the candidate set into a recommendation model, the processing module 6002 is further configured to: modifying, by the processing module, the recommendation model based on the feature weights of the features.

An interface opened to a user is added to a recommendation process of the server according to this embodiment of the present application, so that the user can participate in the intelligent recommendation process through the interface and modify a feature value and a feature weight, a recommendation offset caused by unexpected and temporary browsing can be corrected, providing more accurate and personalized experience.

Figure 19:
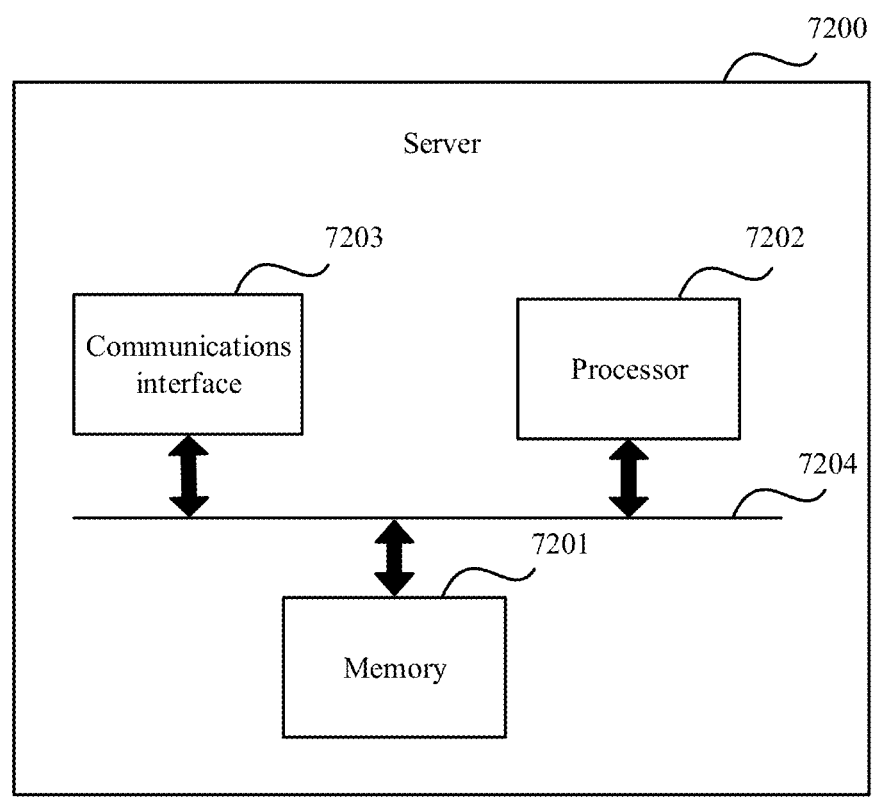
FIG. 19 is a schematic structural diagram of another server according to an embodiment of the present application.

FIG. 19 is a schematic structural diagram of another server according to an embodiment of the present application. As shown in FIG. 19, a server 7200 includes components such as a memory 7201, a processor 7202, and a communications interface 7203. The memory 7201 may be configured to store program code and data of the server. The processor 7202 may be a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The controller/processor may implement or execute various example logical blocks, modules, and circuits described with reference to content disclosed in the present application. Alternatively, the processor may be a combination implementing a computing function, for example, a combination of one or more microprocessors, or a combination of the DSP and a microprocessor. The communications interface is a collective term, and may include one or more interfaces. A person skilled in the art may understand that a structure of the server shown in FIG. 19 does not constitute a limitation to the server, and the server may include more components or fewer components than those shown in the figure, or some components may be combined, or a different component deployment may be used. For example, the server may further include a bus 7204. The communications interface 7203, the processor 7202, and the memory 7201 may be interconnected by using the bus 7204. The bus 7204 may be a peripheral component interconnect (PCI) bus, an extended industry standard architecture (EISA) bus, and the like. The bus 7204 may be classified into an address bus, a data bus, a control bus, and the like. For ease of representation, only one thick line is used to represent the bus in FIG. 19, but this does not mean that there is only one bus or only one type of bus.

As shown in FIG. 19, the memory 7201 is configured to store a program instruction. When executed by the processor 7202, the program instruction stored in the memory 7201 is used to perform the following operations: instructing the communications interface to receive a modification request of a terminal, where the modification request is sent based on a modification operation that is input by a user, and the modification operation from the user is used to instruct to modify at least one recommendation parameter of a plurality of recommendation parameters; and modifying the at least one recommendation parameter based on the modification request.

For example, when executed by the processor 7202, the program instruction stored in the memory 7201 is used to perform the following operations: instructing the communications interface 7203 to receive a recommendation request from the server; obtaining a plurality of recommendation parameters based on the recommendation request; determining recommended content based on the plurality of recommendation parameters; and instructing the communications interface 7203 to send the recommended content sends to the terminal.

For example, the plurality of recommendation parameters include at least one recommendation parameter modified based on a modification operation that is input by the user.

For example, each of the plurality of recommendation parameters includes a feature value and a feature weight of a feature, and the feature is a user feature or a content feature of candidate content.

For example, that the processor 7202 determines the recommended content based on the plurality of recommendation parameters includes: obtaining a candidate set based on feature values of content features in the plurality of recommendation parameters, where the candidate set includes a plurality of pieces of candidate content; inputting the feature value of the user feature and the feature values of the content features of the candidate content in the candidate set into a recommendation model; and determining the recommended content based on an output of the recommendation model.

For example, when the at least modified recommendation parameter further includes feature weights of a plurality of features, before the processor 7202 inputs the feature value of the user feature and the feature values of the content features of the candidate content in the candidate set into a recommendation model, the processor 7202 is further configured to: modifying the recommendation model based on the feature weights of the plurality of features.

An interface opened to a user is added to a recommendation process of the server according to this embodiment of the present application, so that the user can participate in the intelligent recommendation process through the interface and modify a feature value and a feature weight, a recommendation offset caused by unexpected and temporary browsing can be corrected, providing more accurate and personalized experience.

An embodiment of the present application further provides a computer-readable storage medium. The computer-readable storage medium stores a computer program, and the program is executed by the processor 2150 or the processor 7202.

An embodiment of the present application further provides a computer program product including an instruction. When the computer program product runs on a computer, the processor 2150 or the processor 7202 is enabled to perform the methods in FIG. 4 to FIG. 16.

An embodiment of the present application further provides a terminal, where the terminal includes a plurality of applications, and the plurality of applications have a plurality of same features. When setting a terminal system, the user may set the plurality of same features. When an application is enabled, the application is automatically associated with the terminal system, and then a feature is modified, to perform recommendation. For example, there are three video applications (APPs) on a tablet: APP1, APP2, and APP3, and a feature such as recent popularity of a video or an age of a user is added to a tablet setting and modified. When a video application, such as APP2, is enabled, APP2 recommends videos based on the feature associated with the tablet setting.

The embodiments of the present application are not only applicable to providing a user-interventable entry in the field of intelligent recommendation, but also applicable to other application fields of artificial intelligence. Provision of the user-interventable entry can make a service provided by the artificial intelligence more accurate and user-friendly.

Steps of methods or algorithms described in the embodiments disclosed in this specification may be implemented by hardware, a software module executed by a processor, or a combination thereof. The software instruction may include a corresponding software module. The software module may be stored in a random-access memory, a flash memory, a read-only memory, an erasable programmable read-only memory (EPROM) memory, or an electrically erasable programmable read-only memory (EEPROM), a hard disk, an optical disc, or any other form of storage medium well known in the art. For example, a storage medium is coupled to a processor, so that the processor can read information from the storage medium or write information into the storage medium. The storage medium may also be a component of the processor. The processor and the storage medium may exist in the user equipment as discrete components.

Objectives, technical solutions, and benefits of the present application are further described in detail in the foregoing embodiments. It should be understood that the foregoing descriptions are merely exemplary embodiments of the present application, but are not intended to limit the protection scope of the present application. Any modification or improvement made within the spirit and principle of the present application shall fall within the protection scope of the present application.

What is claimed is:

1. A method for modifying a recommendation parameter, comprising:
   displaying, by a terminal, a user interface including options of modifiable recommendation parameters of recommended content, wherein each of the plurality of recommendation parameters corresponds to a feature value and a feature weight of a feature, and the feature is a user feature;
   displaying, by the terminal, a first modification interface in response to a first operation that is input by a user for the options, wherein the first operation requests a display of the first modification interface, and the first modification interface includes a plurality of recommendation parameters, a plurality of areas, and a plurality of boundaries between the plurality of areas, each of the plurality of areas corresponds to one feature, a size of each of the plurality of areas corresponds to the feature weight of the feature;
   sending, by the terminal, a first modification request to a first server in response to a second operation that is input by the user, wherein the second operation modifies at least one of the plurality of recommendation parameters, and the first modification request requests the server to modify the at least one recommendation parameter;
   wherein:
   the second operation comprises moving, in the first modification interface, a first boundary of the plurality of boundaries, and
   the first modification request comprises
      a request for modifying a first feature weight of a first feature associated with the first boundary and a second feature weight of a second feature associated with the first boundary,
   displaying, by the terminal, a second modification interface in response to a third operation that is input by the user and received by the terminal, wherein the third operation is used to instruct the terminal to activate an area in the plurality of areas, and the second modification interface displays a feature value modification range of the first feature corresponding to the area, wherein the feature value modification range of the first feature includes a plurality of feature value ranges; and sending, by the terminal, a second modification request to the first server in response to a fourth operation that is input by the user, wherein:

the fourth operation comprises selecting, in the second modification interface, another feature value range from the feature value modification range of the first feature corresponding to the area, wherein the another feature value range is different from a feature value range of the first feature in the first modification interface, and the second modification request comprises a request for modifying the feature value of the first feature corresponding to the area to the another feature value range.

2. The method according to claim 1, wherein the method further comprises:

sending, by the terminal, a recommendation request to the server;

receiving, by the terminal, recommended content sent by the server, wherein the recommended content is determined by the server according to a plurality of modified recommendation parameters; and displaying, by the terminal, the recommended content.

3. A terminal, comprising a display module, an input unit, and a communications unit, wherein the display module displays a user interface including options of modifiable recommendation parameters of recommended content, wherein each of the plurality of recommendation parameters corresponds to a feature value and a feature weight of a feature, and the feature is a user feature;

the input unit receives a first operation and a second operation from a user for the options, the first operation causing a display of a first modification interface;

the display module further displays the first modification interface including a plurality of recommendation parameters, a plurality of areas, and a plurality of boundaries between the plurality of areas, wherein each of the plurality of areas corresponds to one feature, a size of each of the plurality of areas corresponds to the feature weight of the feature;

the communications unit sends a first modification request to a first server, wherein:

the second operation modifies at least one of the plurality of recommendation parameters, the first modification request requests the server to modify the at least one recommendation parameter, the second operation comprises moving, in the first modification interface, a first boundary of the plurality of boundaries, and the first modification request comprises:

a request for modifying a first feature weight of a first feature associated with the first boundary and a second feature weight of a second feature associated with the first boundary, the display module further displays a second modification interface in response to a third operation from the user, wherein the third operation is used to instruct the display module to activate an area in the plurality of areas, and the second modification interface displays a feature value modification range of the first feature corresponding to the area, wherein the feature value modification range of the first feature includes a plurality of feature value ranges; and the communications unit further sends a second modification request to the first server in response to a fourth operation by the user, wherein:

the third operation comprises selecting, in the second modification interface, another feature value range from the feature value modification range of the first feature corresponding to the area, wherein the another feature value range is different from a feature value range of the first feature in the first modification interface, and the second modification request comprises a request for modifying the feature value of the first feature corresponding to the area to the another feature value range.

4. The terminal according to claim 3, wherein the terminal further comprises a wireless communications interface;

the communications unit sends a recommendation request to the server;

the wireless communications interface is configured to receive recommended content from the server, and the recommended content is determined based on a plurality of modified recommendation parameters; and the displaying module displays the recommended content.

5. A non-transitory computer-readable medium having computer-executable instructions stored thereon, the computer-executable instructions, when executed by a processor, causing the processor to facilitate:

displaying a user interface including options of modifiable recommendation parameters of recommended content, wherein each of the plurality of recommendation parameters corresponds to a feature value and a feature weight of a feature, and the feature is a user feature;

displaying a first modification interface in response to a first operation that is input by a user for the options, wherein the first operation requests a display of the first modification interface, and the first modification interface includes a plurality of recommendation parameters, a plurality of areas, and a plurality of boundaries between the plurality of areas, each of the plurality of areas corresponds to one feature, a size of each of the plurality of areas corresponds to the feature weight of the feature;

sending, a first modification request to a first server in response to a second operation that is input by the user, wherein the second operation modifies at least one of the plurality of recommendation parameters, and the first modification request requests the server to modify the at least one recommendation parameter;

wherein:

the second operation comprises moving, in the first modification interface, a first boundary of the plurality of boundaries, and the first modification request comprises:

a request for modifying a first feature weight of a first feature associated with the first boundary and a second feature weight of a second feature associated with the first boundary, displaying a second modification interface in response to a third operation that is input by the user, wherein the third operation is used to instruct the processor to activate an area in the plurality of areas, and the second modification interface displays a feature value modification range of the first feature corresponding to the area, wherein the feature value modification range of the first feature includes a plurality of feature value ranges; and sending a second modification request to the first server in response to a fourth operation that is input by the user, wherein:

the fourth operation comprises selecting, in the second modification interface, another feature value range from the feature value modification range of the first feature corresponding to the area, wherein the another feature value range is different from a feature value range of the first feature in the first modification interface, and the second modification request comprises a request for modifying the feature value of the first feature corresponding to the area to the another feature value range.

6. The non-transitory computer-readable medium according to claim 5, when executed by a processor, causing the processor to further facilitate:

sending a recommendation request to the server;

receiving recommended content sent by the server, wherein the recommended content is determined by the server according to a plurality of modified recommendation parameters; and displaying the recommended content.

* * * * *